(12) United States Patent
Greco et al.

(10) Patent No.: US 11,478,781 B2
(45) Date of Patent: Oct. 25, 2022

(54) ZIEGLER-NATTA CATALYSTS PREPARED FROM SOLID ALKOXYMAGNESIUM HALIDE SUPPORTS

(71) Applicant: Chevron Phillips Chemical Company LP, The Woodlands, TX (US)

(72) Inventors: Jeffrey F. Greco, University Pl, WA (US); Jim B. Askew, Barnsdall, OK (US)

(73) Assignee: Chevron Phillips Chemical Company LP, The Woodlands, TX (US)

(*) Notice: Subject to any disclaimer, the term of this patent is extended or adjusted under 35 U.S.C. 154(b) by 670 days.

(21) Appl. No.: 16/445,300

(22) Filed: Jun. 19, 2019

(65) Prior Publication Data

US 2020/0398258 A1    Dec. 24, 2020

(51) Int. Cl.
| | |
|---|---|
| C08F 4/02 | (2006.01) |
| C08F 4/634 | (2006.01) |
| C08F 4/635 | (2006.01) |
| C08F 110/02 | (2006.01) |
| C08F 210/16 | (2006.01) |
| B01J 31/02 | (2006.01) |
| C08L 23/18 | (2006.01) |
| C08L 23/08 | (2006.01) |
| C08F 4/622 | (2006.01) |
| C08F 210/08 | (2006.01) |
| C08F 210/14 | (2006.01) |
| C08F 2/34 | (2006.01) |
| B01J 21/06 | (2006.01) |
| B01J 31/14 | (2006.01) |

(52) U.S. Cl.
CPC ......... *B01J 31/0212* (2013.01); *B01J 21/063* (2013.01); *B01J 31/143* (2013.01); *C08F 2/34* (2013.01); *C08F 4/022* (2013.01); *C08F 4/6228* (2013.01); *C08F 210/08* (2013.01); *C08F 210/14* (2013.01); *C08F 210/16* (2013.01); *C08L 23/0815* (2013.01); *C08L 23/18* (2013.01); *B01J 2531/31* (2013.01); *B01J 2531/46* (2013.01)

(58) Field of Classification Search
CPC ...... C08F 4/022; C08F 4/6425; C08F 4/6426; C08F 110/02; C08F 210/16
See application file for complete search history.

(56) References Cited

U.S. PATENT DOCUMENTS

| | | |
|---|---|---|
| 3,242,099 A | 3/1966 | Manyik et al. |
| 3,248,179 A | 4/1966 | Norwood |
| 4,501,885 A | 2/1985 | Sherk et al. |
| 4,526,943 A | 7/1985 | Fuentes, Jr et al. |
| 4,588,790 A | 5/1986 | Jenkins, III et al. |
| 4,794,096 A | 12/1988 | Ewen |
| 4,806,696 A | 2/1989 | Job |
| 4,808,561 A | 2/1989 | Welborn, Jr. |
| 5,352,749 A | 10/1994 | DeChellis et al. |
| 5,436,304 A | 7/1995 | Griffin et al. |
| 5,565,175 A | 10/1996 | Hottovy et al. |
| 5,575,979 A | 11/1996 | Hanson |
| 5,576,259 A | 11/1996 | Hasegawa et al. |
| 5,739,220 A | 4/1998 | Shamshoum et al. |
| 5,767,031 A | 6/1998 | Shamshoum et al. |
| 5,807,938 A | 9/1998 | Kaneko et al. |
| 5,817,591 A | 10/1998 | Shamshoum et al. |
| 5,919,983 A | 7/1999 | Rosen et al. |
| 6,239,235 B1 | 5/2001 | Hottovy et al. |
| 6,262,191 B1 | 7/2001 | Hottovy et al. |
| 6,399,531 B1 | 6/2002 | Job et al. |
| 6,486,274 B1 | 11/2002 | Gray et al. |
| 6,693,058 B1 | 2/2004 | Gray et al. |
| 6,833,415 B2 | 12/2004 | Kendrick et al. |
| 6,916,895 B2 | 7/2005 | Gray et al. |
| 7,294,599 B2 | 11/2007 | Jensen et al. |
| 7,531,606 B2 | 5/2009 | Hendrickson |
| 7,598,327 B2 | 10/2009 | Shaw |
| 7,601,665 B2 | 10/2009 | McDaniel et al. |
| 7,884,163 B2 | 2/2011 | McDaniel et al. |
| 8,114,946 B2 | 2/2012 | Yang et al. |
| 8,309,485 B2 | 11/2012 | Yang et al. |
| 8,822,608 B1 | 9/2014 | Bhandarkar et al. |
| 9,441,056 B2 | 9/2016 | Maus et al. |
| 9,593,175 B2 | 3/2017 | Matsunaga et al. |
| 2004/0059070 A1 | 3/2004 | Whitte et al. |
| 2017/0355792 A1 | 12/2017 | Wang et al. |

FOREIGN PATENT DOCUMENTS

| | | |
|---|---|---|
| EP | 0242801 A2 | 10/1987 |
| WO | 2005095472 A1 | 10/2005 |
| WO | 2007134851 A1 | 11/2007 |
| WO | 2007147714 A1 | 12/2007 |

OTHER PUBLICATIONS

U.S. Appl. No. 11/784,404, filed Apr. 6, 2007, Jun. 16, 2009.
U.S. Appl. No. 14/863,575, filed Sep. 24, 2015, Sep. 12, 2017.
U.S. Appl. No. 14/863,698, filed Sep. 24, 2015, Dec. 19, 2017.
IUPAC Compendium of Chemical Terminology, 2nd Ed., 1997.
Modern Plastics Encyclopedia, Mid-Nov. 1995 Issue, vol. 72, No. 12.
Film Extrusion Manual—Process, Materials, Properties, TAPPI Press, 1992.
Turova, et al., "Alkoxymagnesium Halides," Journal of Organometallic Chemistry, vol. 42, Mar. 10, 1972, pp. 9-17.
Nissinen, et al., "Unexpected cleavage of ether bonds of 1,3-dimethoxypropane in Grignard-Wurtz synthesis of a MgCl2-donor adduct," Journal of Molecular Catalysis A: Chemical, vol. 413, 2016, pp. 94-99.

(Continued)

*Primary Examiner* — Caixia Lu
(74) *Attorney, Agent, or Firm* — Merchant & Gould P.C.

(57) ABSTRACT

Catalyst systems containing a titanium alkoxymagnesium halide supported catalyst component can be used for the polymerization of olefins. The catalyst can be prepared from a microcrystalline solid alkoxymagnesium halide support having a lattice spacing in the 5 nm to 15 nm range.

29 Claims, 2 Drawing Sheets

(56) References Cited

OTHER PUBLICATIONS

Panov, et al., "Impact of reaction products on the Grignard reaction with silanes and ketones," Journal of Organometallic Chemistry, vol. 691, 2006, pp. 4076-7049.

Nissinen, et al., "Methoxymagnesium Chloride—Structure and Interaction with Electron Donors: Experimental and Computational Study," The Journal of Physical Chemistry C, vol. 120, 2016, pp. 21505-21511.

Smith, et al., "Alkoxymagnesium Halide Supports for Heterogeneous Ziegler-Natta Polymerization Catalysts," Inorg. Chem., vol. 32, 1993, pp. 1161-1166.

ZIEGLER-NATTA CATALYSTS PREPARED FROM SOLID ALKOXYMAGNESIUM HALIDE SUPPORTS

FIELD OF THE INVENTION

The present disclosure generally relates to Ziegler-Natta catalysts, methods for preparing the catalysts, methods for using the catalysts to polymerize olefins, the polymer resins produced using such catalysts, and articles produced using these polymer resins. More particularly, the present disclosure relates to microcrystalline solid alkoxymagnesium halide supports, and to the subsequent use of the alkoxymagnesium halide supports to produce titanium alkoxymagnesium halide supported catalysts.

BACKGROUND OF THE INVENTION

Polyolefins such as high density polyethylene (HDPE) homopolymer and linear low density polyethylene (LLDPE) copolymer can be produced using various combinations of catalyst systems and polymerization processes. Ziegler-Natta catalysts are commonly used in part to their low cost, relatively high activity, and robust nature. Methods to modify the catalytic behavior and improve the activity of Ziegler-Natta catalysts, and to improve the resultant properties of the polymer produced, are on-going. Improvements in the support also are being investigated, such as increasing pore volume and surface area, and tightening the particle size distribution. Magnesium chloride has been the preferred support for Ziegler-Natta catalysts for decades, and the preparation of the support has changed significantly over time. Early catalysts used a ball mill to grind the magnesium chloride crystals into the active delta form prior to reaction with titanium, while later generation catalysts were prepared via a chemical route using organomagnesium complexes dissolved in solvents. These complexes were reacted with titanium (IV) chloride and resulted in a precipitated support, which could be used to generate the active catalyst. More recently, magnesium alkoxides have been used as the magnesium source for the support. However, there has been relatively little investigation into the preparation and modification of alkoxymagnesium chloride supports for Ziegler-Natta catalysts, and their use in olefin polymerization processes.

It can be beneficial to prepare supported Ziegler-Natta catalysts that have improved hydrogen response and comonomer incorporation, while maintaining high catalytic activity. Accordingly, it is to these ends that the present invention is generally directed.

SUMMARY OF THE INVENTION

This summary is provided to introduce a selection of concepts in a simplified form that are further described below in the detailed description. This summary is not intended to identify required or essential features of the claimed subject matter. Nor is this summary intended to be used to limit the scope of the claimed subject matter.

The present invention generally relates to new catalyst supports, methods for preparing the catalyst supports, new catalyst compositions, methods for preparing the catalyst compositions, methods for using the catalyst compositions to polymerize olefins, the polymer resins produced using such catalyst compositions, and articles produced using these polymer resins. In particular, aspects of the present invention are directed to microcrystalline solid alkoxymagnesium halide supports, a representative example of which can have the formula $Mg(OR^1)_nX_{2-n}$. In this formula, $R^1$ can be a linear or branched $C_5$-$C_{18}$ alkyl group, each X independently can be a halogen, and n can be a number from 0.5 to 1.5. The microcrystalline solid alkoxymagnesium halide support can be characterized by a lattice spacing in a range from about 5 nm to about 15 nm. Further, a titanium alkoxymagnesium halide supported catalyst consistent with this invention can comprise titanium and the microcrystalline solid alkoxymagnesium halide support. Catalyst compositions can include the titanium alkoxymagnesium halide supported catalyst and a co-catalyst, and these catalysts compositions can be used to produce, for example, ethylene-based homopolymers and copolymers for variety of end-use applications.

Processes for preparing the microcrystalline solid alkoxymagnesium halide support (having the formula $Mg(OR^1)_nX_{2-n}$) also are described herein. For instance, the process can comprise (i) contacting a dialkylmagnesium compound having the formula $MgR_2$ with an alcohol compound having the formula $R^1OH$ to form an alkylmagnesium alkoxide compound having the formula $Mg(OR^1)R$, and (ii) contacting the alkylmagnesium alkoxide compound having the formula $Mg(OR^1)R$ with a halide compound having the formula $SiX_4$ to form a mixture containing the microcrystalline solid alkoxymagnesium halide support having the formula $Mg(OR^1)_nX_{2-n}$. In these formulas, each R independently can be a linear or branched alkyl group, $R^1$ can be a linear or branched $C_5$-$C_{18}$ alkyl group, each X independently can be a halogen, and n can be a number from 0.5 to 1.5. The microcrystalline solid alkoxymagnesium halide support can be characterized by a lattice spacing in a range from about 5 nm to about 15 nm.

A titanium alkoxymagnesium halide supported catalyst can be prepared by contacting the microcrystalline solid alkoxymagnesium halide support with a titanium compound to form the titanium alkoxymagnesium halide supported catalyst, which can be characterized by a lattice spacing in a range from about 5 nm to about 15 nm.

Beneficially, the titanium alkoxymagnesium halide supported catalysts have comparable catalytic activity and comonomer response to that of traditional Ziegler-Nana catalysts, but with improved hydrogen response.

Both the foregoing summary and the following detailed description provide examples and are explanatory only. Accordingly, the foregoing summary and the following detailed description should not be considered to be restrictive. Further, features or variations may be provided in addition to those set forth herein. For example, certain aspects and embodiments may be directed to various feature combinations and sub-combinations described in the detailed description.

DEFINITIONS

Figure 1:
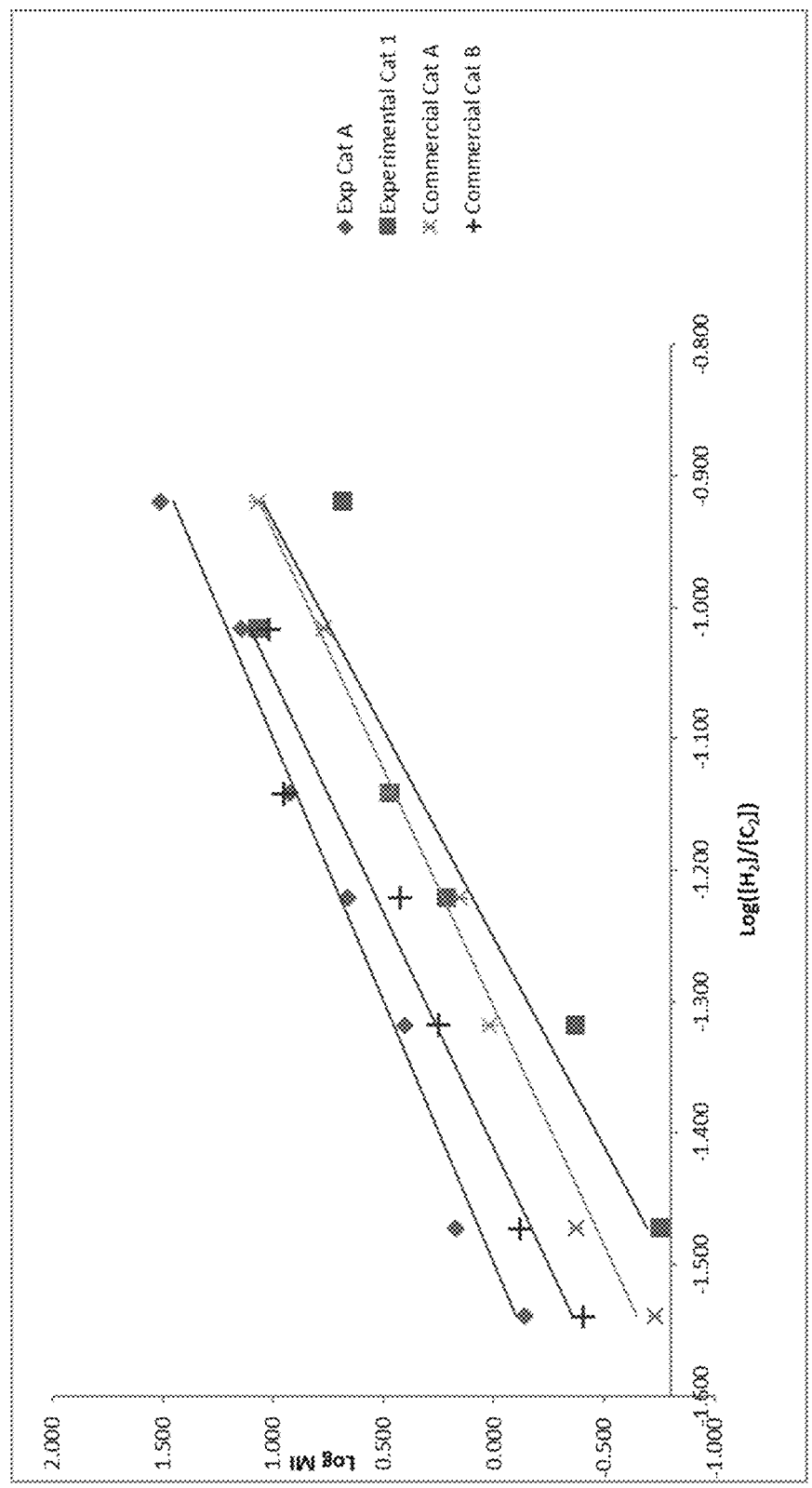
FIG. 1 presents a plot of the logarithm of melt index versus the logarithm of $[H_2]/[C_2]$ for the polymers produced using Experimental Catalyst A, Experimental Catalyst 1, Commercial Catalyst A, and Commercial Catalyst B.

To define more clearly the terms used herein, the following definitions are provided. Unless otherwise indicated, the following definitions are applicable to this disclosure. If a term is used in this disclosure but is not specifically defined herein, the definition from the IUPAC Compendium of Chemical Terminology, $2^{nd}$ Ed (1997), can be applied, as long as that definition does not conflict with any other disclosure or definition applied herein, or render indefinite or non-enabled any claim to which that definition is applied. To the extent that any definition or usage provided by any document incorporated herein by reference conflicts with the definition or usage provided herein, the definition or usage provided herein controls.

Herein, features of the subject matter are described such that, within particular aspects, a combination of different features can be envisioned. For each and every aspect and each and every feature disclosed herein, all combinations that do not detrimentally affect the compounds, compositions, processes, or methods described herein are contemplated with or without explicit description of the particular combination. Additionally, unless explicitly recited otherwise, any aspect or feature disclosed herein can be combined to describe inventive compounds, compositions, processes, or methods consistent with the present disclosure.

Generally, groups of elements are indicated using the numbering scheme indicated in the version of the periodic table of elements published in Chemical and Engineering News, 63(5), 27, 1985. In some instances, a group of elements can be indicated using a common name assigned to the group; for example, alkali metals for Group 1 elements, alkaline earth metals for Group 2 elements, transition metals for Group 3-12 elements, and halogens or halides for Group 17 elements.

The term "hydrocarbon" whenever used in this specification and claims refers to a compound containing only carbon and hydrogen, whether saturated or unsaturated. Other identifiers can be utilized to indicate the presence of particular groups in the hydrocarbon (e.g., halogenated hydrocarbon indicates the presence of one or more halogen atoms replacing an equivalent number of hydrogen atoms in the hydrocarbon). The term "hydrocarbyl group" is used herein in accordance with the definition specified by IUPAC: a univalent group formed by removing a hydrogen atom from a hydrocarbon (that is, a group containing only carbon and hydrogen). Non-limiting examples of hydrocarbyl groups include alkyl, alkenyl, aryl, and aralkyl groups, amongst other groups.

For any particular compound or group disclosed herein, any name or structure (general or specific) presented is intended to encompass all conformational isomers, regioisomers, stereoisomers, and mixtures thereof that can arise from a particular set of substituents, unless otherwise specified. The name or structure (general or specific) also encompasses all enantiomers, diastereomers, and other optical isomers (if there are any) whether in enantiomeric or racemic forms, as well as mixtures of stereoisomers, as would be recognized by a skilled artisan, unless otherwise specified. For instance, a general reference to pentane includes n-pentane, 2-methyl-butane, and 2,2-dimethylpropane; and a general reference to a butyl group includes a n-butyl group, a sec-butyl group, an iso-butyl group, and a t-butyl group.

Unless otherwise specified, the term "substituted" when used to describe a group, for example, when referring to a substituted analog of a particular group, is intended to describe any non-hydrogen moiety that formally replaces a hydrogen in that group, and is intended to be non-limiting. Also, unless otherwise specified, a group or groups can also be referred to herein as "unsubstituted" or by equivalent terms such as "non-substituted," which refers to the original group in which a non-hydrogen moiety does not replace a hydrogen within that group. Moreover, unless otherwise specified, "substituted" is intended to be non-limiting and include inorganic substituents or organic substituents as understood by one of ordinary skill in the art.

The terms "contacting" and "combining" are used herein to describe compositions, processes, and methods in which the materials or components are contacted or combined together in any order, in any manner, and for any length of time, unless otherwise specified. For example, the materials or components can be blended, mixed, slurried, dissolved, reacted, treated, compounded, or otherwise contacted or combined in some other manner or by any suitable method or technique.

In this disclosure, while compositions, processes, and methods are described in terms of "comprising" various components or steps, the compositions, processes, and methods also can "consist essentially of" or "consist of" the various components or steps, unless stated otherwise.

The terms "a," "an," and "the" are intended to include plural alternatives, e.g., at least one. For instance, the disclosure of "an alcohol compound," "a halide compound," etc., is meant to encompass one, or mixtures or combinations of more than one, alcohol compound, halide compound, etc., unless otherwise specified.

The term "polymer" is used herein generically to include olefin homopolymers, copolymers, terpolymers, and the like, as well as alloys and blends thereof. The term "polymer" also includes impact, block, graft, random, and alternating copolymers. A copolymer can be derived from an olefin monomer and one olefin comonomer, while a terpolymer can be derived from an olefin monomer and two olefin comonomers. Accordingly, "polymer" encompasses copolymers and terpolymers. Similarly, the scope of the term "polymerization" includes homopolymerization, copolymerization, and terpolymerization. Therefore, an ethylene polymer would include ethylene homopolymers, ethylene copolymers (e.g., ethylene/α-olefin copolymers), ethylene terpolymers, and the like, as well as blends or mixtures thereof. Thus, an ethylene polymer encompasses polymers often referred to in the art as LLDPE (linear low density polyethylene) and HDPE (high density polyethylene). As an example, an ethylene copolymer can be derived from ethylene and a comonomer, such as 1-butene, 1-hexene, or 1-octene. If the monomer and comonomer were ethylene and 1-hexene, respectively, the resulting polymer can be categorized an as ethylene/1-hexene copolymer. The term "polymer" also includes all possible geometrical configurations, if present and unless stated otherwise, and such configurations can include isotactic, syndiotactic, and random symmetries. The term "polymer" also is meant to include all molecular weight polymers, and is inclusive of lower molecular weight polymers or oligomers.

The terms "catalyst composition," "catalyst mixture," "catalyst system," and the like, do not depend upon the actual product or composition resulting from the contact or reaction of the initial components of the disclosed or claimed catalyst composition/mixture/system, the nature of the active catalytic site, or the fate of the co-catalyst or the titanium alkoxymagnesium halide supported catalyst after combining these components. Therefore, the terms "catalyst composition," "catalyst mixture," "catalyst system," and the like, encompass the initial starting components of the composition, as well as whatever product(s) may result from contacting these initial starting components, and this is inclusive of both heterogeneous and homogenous catalyst systems or compositions. The terms "catalyst composition,"

"catalyst mixture," "catalyst system," and the like, may be used interchangeably throughout this disclosure.

Various numerical ranges are disclosed herein. When a range of any type is disclosed or claimed, the intent is to disclose or claim individually each possible number that such a range could reasonably encompass, including end points of the range as well as any sub-ranges and combinations of sub-ranges encompassed therein, unless otherwise specified. For example, for any disclosed or claimed chemical moiety having a certain number of carbon atoms, the intent is to disclose or claim individually every possible number that such a range could encompass, consistent with the disclosure herein. For example, the disclosure that a moiety is a $C_1$ to Cis alkyl group, or in alternative language, an alkyl group having from 1 to 18 carbon atoms, as used herein, refers to a moiety that can have 1, 2, 3, 4, 5, 6, 7, 8, 9, 10, 11, 12, 13, 14, 15, 16, 17, or 18 carbon atoms, as well as any range between these two numbers (for example, a $C_1$ to $C_6$ alkyl group), and also including any combination of ranges between these two numbers (for example, a $C_2$ to $C_4$ and a $C_8$ to $C_{12}$ alkyl group).

Similarly, another representative example follows for the molar ratio of the alcohol compound to the dialkylmagnesium compound in step (i). By a disclosure that the molar ratio consistent with aspects of step (i) of this invention can be in a range from about 0.4:1 to about 1.2:1, the intent is to recite that the ratio can be any ratio in the range and, for example, can be equal to about 0.4:1, about 0.5:1, about 0.6:1, about 0.7:1, about 0.8:1, about 0.9:1, about 1:1, about 1.1:1, or about 1.2:1. Additionally, the molar ratio can be within any range from about 0.4:1 to about 1.2:1 (e.g., from about 0.5:1 to about 0.9:1), and this also includes any combination of ranges between about 0.4:1 and about 1.2:1 (e.g., the ratio can be in a range from about 0.4:1 to about 0.6:1, or from about 0.8:1 to about 1:1). Further, in all instances, where "about" a particular value is disclosed, then that value itself is disclosed. Thus, the disclosure that the molar ratio can be from about 0.4:1 to about 1.2:1 also discloses a molar ratio in a range from 0.4:1 to 1.2:1 (e.g., from 0.5:1 to 0.9:1), and this also includes any combination of ranges between 0.4:1 and 1.2:1 (e.g., the ratio can be in a range from 0.4:1 to 0.6:1, or from 0.8:1 to 1:1). Likewise, all other ranges disclosed herein should be interpreted in a manner similar to these examples.

The term "about" means that amounts, sizes, formulations, parameters, and other quantities and characteristics are not and need not be exact, but can be approximate including being larger or smaller, as desired, reflecting tolerances, conversion factors, rounding off, measurement errors, and the like, and other factors known to those of skill in the art. In general, an amount, size, formulation, parameter or other quantity or characteristic is "about" or "approximate" whether or not expressly stated to be such. The term "about" also encompasses amounts that differ due to different equilibrium conditions for a composition resulting from a particular initial mixture. Whether or not modified by the term "about," the claims include equivalents to the quantities. The term "about" can mean within 10% of the reported numerical value, and often within 5% of the reported numerical value.

Although any methods, devices, and materials similar or equivalent to those described herein can be used in the practice or testing of the invention, the typical methods, devices, and materials are herein described.

All publications and patents mentioned herein are incorporated herein by reference for the purpose of describing and disclosing, for example, the constructs and methodologies that are described in the publications, which might be used in connection with the presently described invention.

DETAILED DESCRIPTION OF THE INVENTION

The present invention is directed generally to new supported catalysts, methods for preparing the supported catalysts, methods for using the supported catalysts in catalyst compositions to polymerize olefins, the polymer resins produced using such catalyst compositions, and articles produced using these polymer resins. In particular, the present invention relates to microcrystalline solid alkoxymagnesium halide supports, and methods of their preparation, and to resultant titanium alkoxymagnesium halide supported catalysts prepared from the alkoxymagnesium halide supports.

In olefin polymerization processes, it is very beneficial to control the molecular weight and density of an olefin polymer using as little hydrogen and comonomer (respectively) as possible in the polymerization process. As disclosed herein, it was unexpectedly found that use of higher carbon number or bulky alcohols in the synthesis of alkoxymagnesium chloride supports can result in different lattice spacing in the support structure and in the resulting catalyst, which in turn, can provide beneficial improvements in hydrogen response and comonomer response.

Solid Alkoxymagnesium Halide Supports

Aspects of this invention are directed to a process for producing a microcrystalline solid alkoxymagnesium halide support having the formula $Mg(OR^1)_nX_{2-n}$. One such process can comprise (or consist essentially of, or consist of) (i) contacting a dialkylmagnesium compound having the formula $MgR_2$ with an alcohol compound having the formula $R^1OH$ to form an alkylmagnesium alkoxide compound having the formula $Mg(OR^1)R$, and (ii) contacting the alkylmagnesium alkoxide compound having the formula $Mg(OR^1)R$ with a halide compound having the formula $SiX_4$ to form a mixture containing the microcrystalline solid alkoxymagnesium halide support having the formula $Mg(OR^1)_nX_{2-n}$. In this process, each R independently can be a linear or branched alkyl group, $R^1$ can be a linear or branched $C_5$-$C_{18}$ alkyl group, each X independently can be a halogen, and n can be a number from 0.5 to 1.5. The microcrystalline solid alkoxymagnesium halide support can be characterized by a lattice spacing in a range from about 5 nm to about 15 nm.

Generally, the features of this process (e.g., the dialkylmagnesium compound, the alcohol compound, the alkylmagnesium alkoxide compound, the halide compound, the lattice spacing, and the conditions under which step (i) and step (ii) are conducted, among others) are independently described herein and these features can be combined in any combination to further describe the disclosed process to produce the microcrystalline solid alkoxymagnesium halide support. Moreover, additional process steps can be performed before, during, and/or after any of the steps in any of the processes disclosed herein, and can be utilized without limitation and in any combination to further describe these processes, unless stated otherwise. Further, any microcrystalline solid alkoxymagnesium halide supports produced in accordance with the disclosed processes are within the scope of this disclosure and are encompassed herein.

In step (i), a dialkylmagnesium compound having the formula $MgR_2$ can be contacted with an alcohol compound having the formula $R^1OH$ to form an alkylmagnesium alkoxide compound having the formula $Mg(OR^1)R$. Any suitable dialkylmagnesium compound can be used, and non-limiting examples of the dialkylmagnesium compound can include diethyl magnesium, dipropyl magnesium, dibutyl magnesium, dihexyl magnesium, butyl ethyl magnesium, butyl octyl magnesium, and the like, as well as any combination thereof.

In another aspect, each R—of the dialkylmagnesium compound having the formula $MgR_2$—independently can be any suitable alkyl group, such as a $C_1$ to $C_{18}$ linear or branched alkyl group; alternatively, a $C_1$ to $C_{12}$ linear or branched alkyl group; or alternatively, a $C_1$ to $C_6$ linear or branched alkyl group. In yet another aspect, each R independently can be a methyl group, an ethyl group, a propyl group, a butyl group, a pentyl group, a hexyl group, a heptyl group, an octyl group, a nonyl group, a decyl group, a undecyl group, a dodecyl group, a tridecyl group, a tetradecyl group, a pentadecyl group, a hexadecyl group, a heptadecyl group, or an octadecyl group. In still another aspect, each R independently can be a methyl group, an ethyl group, a n-propyl group, an iso-propyl group, a n-butyl group, an iso-butyl group, a sec-butyl group, a tert-butyl group, a n-pentyl group, an iso-pentyl group, a sec-pentyl group, or a neopentyl group. In certain aspects, each R can be different; for instance, one R can be butyl and one R can be ethyl—thus, the dialkylmagnesium compound can be butyl ethyl magnesium.

Referring to the alcohol compound having the formula $R^1OH$ in step (i), $R^1$ can be a linear or branched $C_5$-$C_{18}$ alkyl group. In one aspect of this invention, $R^1$ can be a linear or branched $C_5$-$C_{14}$ alkyl group, while in another aspect, $R^1$ can be a linear or branched $C_6$-$C_{18}$ alkyl group, and in yet another aspect, $R^1$ can be a linear or branched $C_8$-$C_{12}$ alkyl group.

$R^1$ in the alcohol compound ($R^1OH$) can be, in some aspects, a pentyl group, a hexyl group, a heptyl group, an octyl group, a nonyl group, a decyl group, a undecyl group, a dodecyl group, a tridecyl group, or a tetradecyl group. In other aspects, $R^1$ can be a hexyl group, a heptyl group, an octyl group, a nonyl group, a decyl group, a undecyl group, a dodecyl group, a tridecyl group, a tetradecyl group, a pentadecyl group, a hexadecyl group, a heptadecyl group, or an octadecyl group.

Accordingly, the alcohol compound in step (i) can comprise a pentanol, a hexanol, a heptanol, an octanol, a nonanol, a decanol, an undecanol, a dodecanol, a tridecanol, a tetradecanol, a pentadecanol, a hexadecanol, a heptadecanol, an octadecanol, or any combination thereof. Thus, the alcohol compound can comprise, for instance, 1-pentanol, 1-hexanol, 2-hexanol, 3-hexanol, 1-heptanol, 2-heptanol, 3-heptanol, 4-heptanol, 1-octanol, 2-octanol, 3-octanol, 4-octanol, 2-ethyl-1-hexanol, 2-methyl-3-heptanol, 1-decanol, 2-decanol, 3-decanol, 4-decanol, 5-decanol, 1-undecanol, 2-undecanol, 7-methyl-2-decanol, 1-dodecanol, 2-dodecanol, 2-ethyl-1-decanol, 1-tetradecanol, 1-hexadecanol, 1-octadecanol, and the like, or any combination thereof; alternatively, 1-pentanol; alternatively, 1-hexanol; alternatively, 2-hexanol; alternatively, 3-hexanol; alternatively, 1-heptanol; alternatively, 2-heptanol; alternatively, 3-heptanol; alternatively, 4-heptanol; alternatively, 1-octanol; alternatively, 2-octanol; alternatively, 3-octanol; alternatively, 4-octanol; alternatively, 2-ethyl-1-hexanol; alternatively, 2-methyl-3-heptanol; alternatively, 1-decanol; alternatively, 2-decanol; alternatively, 3-decanol; alternatively, 4-decanol; alternatively, 5-decanol; alternatively, 1-undecanol; alternatively, 2-undecanol; alternatively, 7-methyl-2-decanol; alternatively, 1-dodecanol; alternatively, 2-dodecanol; alternatively, 2-ethyl-1-decanol; alternatively, 1-tetradecanol; alternatively, 1-hexadecanol; or alternatively, 1-octadecanol.

The relative amounts of the dialkylmagnesium compound and the alcohol compound are not particularly limited, so long as a portion—but not all—of the alkyl groups in the dialkylmagnesium compound are replaced by an —$OR^1$ group. Typically, the molar ratio of the alcohol compound to the dialkylmagnesium compound in step (i) can range from about 0.4:1 to about 1.2:1, from about 0.4:1 to about 1:1, from about 0.4:1 to about 0.8:1, from about 0.5:1 to about 0.9:1, or from about 0.6:1 to about 0.7:1, and the like.

In step (i), the dialkylmagnesium compound and the alcohol compound can be contacted in any suitable non-polar solvent. Illustrative and non-limiting examples of suitable non-polar solvents can include aromatic hydrocarbons (e.g., toluene and xylene), alkanes (e.g., hexane and heptane), and the like. Mixtures or combinations of more than one non-polar solvent can be used in step (i). When a solvent is present, the dialkylmagnesium compound, the alcohol compound, and the solvent can be contacted or combined together in any order.

Referring now to step (ii), the alkylmagnesium alkoxide compound having the formula $Mg(OR^1)R$ can be contacted with a halide compound having the formula $SiX_4$ to form a mixture containing the microcrystalline solid alkoxymagnesium halide support having the formula $Mg(OR^1)_nX_{2-n}$. For the halide compound having the formula $SiX_4$, each X independently can be a halogen. In some aspects, each X independently can be bromine or chlorine, while in other aspects, each X can be chlorine. For the microcrystalline solid alkoxymagnesium halide support having the formula $Mg(OR^1)_nX_{2-n}$, n can a number from 0.5 to 1.5 (inclusive). For example, n can range from 0.6 to 1.4 or, alternatively, n can range 0.8 to 1.2.

The relative amounts of the alkylmagnesium alkoxide compound and the halide compound are not particularly limited, so long as a portion—but not all—of the alkyl groups in the alkylmagnesium alkoxide compound are replaced by a halogen. Typically, the molar ratio of the halide compound to the alkoxide compound in step (ii) can range from about 0.4:1 to about 1.2:1, from about 0.6:1 to about 1.2:1, from about 0.6:1 to about 1:1, from about 0.7:1 to about 0.9:1, or from about 0.8:1 to about 1:1, and the like.

Like step (i), step (ii) can be conducted in a suitable non-polar solvent, such as an aromatic hydrocarbon (e.g., toluene and xylene), an alkane (e.g., hexane and heptane), and the like, as well as any combination thereof. The solvent in step (i) can be the same as, or different from, the solvent in step (ii). When a solvent is present in step (ii), the alkoxymagnesium compound, the halide compound, and the solvent can be contacted or combined together in any order.

Steps (i) and (ii) can be conducted, independently, at any suitable temperature and for any suitable period of time. Representative and non-limiting ranges for the temperature can include from about 5° C. to about 80° C., from about 15° C. to about 80° C., from about 10° C. to about 70° C., from about 20° C. to about 70° C., from about 40° C. to about 70° C., from about 50° C. to about 65° C., or from about 55° C. to about 70° C., and the like. These temperature ranges also are meant to encompass circumstances where step (i) and/or step (ii) is/are performed at a series of different temperatures, instead of at a single fixed temperature, falling within the respective temperature ranges, wherein at least one temperature is within the recited ranges.

Similarly, the time period for performing step (i) and step (ii) is not particularly limited, and can be conducted for any suitable period of time. In some aspects, the time period for each step, independently, can be least about 1 minute, at least about 15 minutes, at least about 30 minutes, or at least about 45 minutes. In other aspects, the time period for each step, independently, can be from about 1 minute to about 24 hours, from about 15 minute to about 8 hours, from about 30 minutes to about 6 hours, from about 30 minutes to about 3 hours, or from about 45 minutes to about 5 hours.

After step (ii), the process can further comprise a step of isolating the microcrystalline solid alkoxymagnesium halide support from the mixture, using any suitable technique, such as draining, sieving, filtering, pressing, centrifuging, and the like, as well as combinations of two or more techniques. If desired, the process can further comprise a step of washing and/or a step of drying (e.g., under reduced pressure) the microcrystalline solid alkoxymagnesium halide support after step (ii). Thus, the microcrystalline solid alkoxymagnesium halide support can be washed, can be dried, or can be both washed and dried, after step (ii).

The disclosed processes produce a microcrystalline solid alkoxymagnesium halide support—having the formula $Mg(OR^1)_nX_{2-n}$—and characterized, generally, by a lattice spacing in a range from about 5 nm to about 15 nm. In one aspect, the lattice spacing can be in a range from about 5 nm to about 12 nm, while in another aspect, the lattice spacing can range from about 5 nm to about 10 nm, and in yet another aspect, the lattice spacing can range from about 6 nm to about 15 nm, and in still another aspect, the lattice spacing can range from about 6 nm to about 12 nm.

Microcrystalline solid alkoxymagnesium halide supports having the formula $Mg(OR^1)_nX_{2-n}$ also are encompassed herein. $R^1$ can be any linear or branched $C_5$-$C_{18}$ alkyl group disclosed herein, each X independently can be any halogen disclosed herein, and n can be any number from 0.5 to 1.5 disclosed herein. Further, the microcrystalline solid alkoxymagnesium halide support can be characterized by any lattice spacing ranging from about 5 nm to about 15 nm disclosed herein.

Thus, the microcrystalline solid alkoxymagnesium halide support having the formula $Mg(OR^1)_nX_{2-n}$ can be characterized by a lattice spacing from about 5 nm to about 12 nm (or from about 5 nm to about 10 nm, or from about 6 nm to about 15 nm, or from about 6 nm to about 12 nm), and in which $R^1$ can be a linear or branched $C_5$-$C_{14}$ alkyl group (or a linear or branched $C_6$-$C_{18}$ alkyl group, or a linear or branched $C_8$-$C_{12}$ alkyl group), each X independently can be bromine or chlorine (or each X can be chlorine), and n can range from 0.6 to 1.4 (or from 0.8 to 1.2). Specifically contemplated are microcrystalline solid alkoxymagnesium halide supports in which $R^1$ is a pentyl group, a hexyl group, a heptyl group, an octyl group, a nonyl group, a decyl group, a undecyl group, a dodecyl group, a tridecyl group, or a tetradecyl group; and in which $R^1$ is a hexyl group, a heptyl group, an octyl group, a nonyl group, a decyl group, a undecyl group, a dodecyl group, a tridecyl group, a tetradecyl group, a pentadecyl group, a hexadecyl group, a heptadecyl group, or an octadecyl group.

Titanium Alkoxymagnesium Halide Supported Catalysts

Aspects of this invention are directed to a process for producing a titanium alkoxymagnesium halide supported catalyst. One such process can comprise (or consist essentially of, or consist of) contacting any of the microcrystalline solid alkoxymagnesium halide supports disclosed herein with a titanium compound to form the titanium alkoxymagnesium halide supported catalyst. The titanium alkoxymagnesium halide supported catalyst can be characterized by a lattice spacing in any range from about 5 nm to about 15 nm disclosed herein. For instance, the titanium alkoxymagnesium halide supported catalyst can have a lattice spacing in a range from about 5 nm to about 12 nm; alternatively, from about 5 nm to about 10 nm; alternatively, from about 6 nm to about 15 nm; or alternatively, from about 6 nm to about 12 nm.

Generally, the features of this process (e.g., the alkoxymagnesium support, the titanium compound, the lattice spacing, and the conditions under which the components are contacted, among others) are independently described herein and these features can be combined in any combination to further describe the disclosed process to produce the titanium alkoxymagnesium halide supported catalyst. Moreover, additional process steps can be performed before, during, and/or after any of the steps in any of the processes disclosed herein, and can be utilized without limitation and in any combination to further describe these processes, unless stated otherwise. Further, any titanium alkoxymagnesium halide supported catalysts produced in accordance with the disclosed processes are within the scope of this disclosure and are encompassed herein.

The alkoxymagnesium halide support and the titanium compound can be contacted in any suitable manner to form the supported catalyst. An illustrative and non-limiting technique can be to contact or combine a slurry of the microcrystalline solid alkoxymagnesium halide support in a diluent with the titanium compound. The diluent is not particularly limited, and often can be any of the non-polar solvents disclosed hereinabove, such as an aromatic hydrocarbon (e.g., toluene and xylene), or an alkane (e.g., hexane and heptane), and the like, as well as any combination thereof.

If desired, the titanium alkoxymagnesium halide supported catalyst can be contacted with a second titanium compound, which can be the same as or different from the (first) titanium compound.

Any suitable titanium compound can be used. For instance, the titanium compound (or the second titanium compound) can comprise a titanium halide (e.g., $TiCl_3$, $TiCl_4$, $TiBr_4$, or $TiI_4$), a titanium alkoxide ($Ti(OEt)_4$ or $Ti(OPr)_4$), an alkoxytitanium halide (e.g., $Ti(OBu)Cl_3$ or $Ti(OBu)_2Cl_2$), and the like, as well as any combination thereof.

The alkoxymagnesium halide support and the titanium compound (or the second titanium compound) can be contacted at any suitable temperature and for any suitable period of time. While not limited thereto, suitable temperature and time conditions can be the same as those disclosed hereinabove for steps (i) and (ii) of the process to produce the alkoxymagnesium halide support.

The amount of titanium in the titanium alkoxymagnesium halide supported catalyst disclosed herein is not particularly limited. Generally, however, the amount of titanium in the titanium alkoxymagnesium halide supported catalyst can range from about 0.1 to about 20 wt. %; alternatively, from about 0.1 to about 10 wt. %; alternatively, from about 0.2 to about 5 wt. %; alternatively, from about 0.3 to about 2 wt. %; or alternatively, from about 1 to about 10 wt. % titanium. These weight percentages are based on the amount of titanium relative to the total weight of the catalyst.

After formation of the supported catalyst, the process can further comprise a step of isolating the titanium alkoxymagnesium halide supported catalyst using any suitable technique, such as draining, sieving, filtering, pressing, centrifuging, and the like, as well as combinations of two or more techniques. If desired, the process can further comprise a step of washing and/or a step of drying (e.g., under reduced pressure) the titanium alkoxymagnesium halide supported catalyst. Thus, the titanium alkoxymagnesium halide supported catalyst can be washed, can be dried, or can be both washed and dried.

Titanium alkoxymagnesium halide supported catalysts containing titanium and a microcrystalline solid alkoxymagnesium halide support having the formula $Mg(OR^1)_nX_{2-n}$ also are encompassed herein. IV can be any linear or branched $C_5$-$C_{18}$ alkyl group disclosed herein, each X independently can be any halogen disclosed herein, and n can be any number from 0.5 to 1.5 disclosed herein. Further, the catalyst can be characterized by any lattice spacing ranging from about 5 nm to about 15 nm disclosed herein, and can contain any amount of titanium disclosed herein.

Thus, the catalyst can contain a microcrystalline solid alkoxymagnesium halide support having the formula $Mg(OR^1)_nX_{2-n}$, and can be characterized by a lattice spacing from about 5 nm to about 12 nm (or from about 5 nm to about 10 nm, or from about 6 nm to about 15 nm, or from about 6 nm to about 12 nm), and in which IV can be a linear or branched $C_5$-$C_{14}$ alkyl group (or a linear or branched $C_6$-$C_{18}$ alkyl group, or a linear or branched $C_8$-$C_{12}$ alkyl group), each X independently can be bromine or chlorine (or each X can be chlorine), and n can range from 0.6 to 1.4 (or from 0.8 to 1.2). Specifically contemplated are catalysts with microcrystalline solid alkoxymagnesium halide supports in which IV is a pentyl group, a hexyl group, a heptyl group, an octyl group, a nonyl group, a decyl group, a undecyl group, a dodecyl group, a tridecyl group, or a tetradecyl group; and in which IV is a hexyl group, a heptyl group, an octyl group, a nonyl group, a decyl group, a undecyl group, a dodecyl group, a tridecyl group, a tetradecyl group, a pentadecyl group, a hexadecyl group, a heptadecyl group, or an octadecyl group.

Catalyst Compositions

Various processes for preparing catalyst compositions containing a titanium alkoxymagnesium halide supported catalyst can be utilized. One such process for producing a catalyst composition can comprise (or consist essentially of, or consist of) contacting any of the alkoxymagnesium halide supports disclosed herein with any of the titanium compounds disclosed herein to form any of the supported catalysts disclosed herein; and contacting the supported catalyst and a co-catalyst to form the catalyst composition.

In a related aspect, a catalyst composition consistent with this invention can comprise any of the titanium alkoxymagnesium halide supported catalysts disclosed herein and any suitable co-catalyst. The co-catalyst can comprise a metal hydrocarbyl compound, examples of which include non-halide metal hydrocarbyl compounds, metal hydrocarbyl halide compounds, non-halide metal alkyl compounds, metal alkyl halide compounds, and so forth. The hydrocarbyl group (or alkyl group) can be any hydrocarbyl (or alkyl) group disclosed herein. Moreover, in some aspects, the metal of the metal hydrocarbyl can be a group 1, 2, 11, 12, 13, or 14 metal; alternatively, a group 13 or 14 metal; or alternatively, a group 13 metal. Hence, in some aspects, the metal of the metal hydrocarbyl (non-halide metal hydrocarbyl or metal hydrocarbyl halide) can be lithium, sodium, potassium, rubidium, cesium, beryllium, magnesium, calcium, strontium, barium, zinc, cadmium, boron, aluminum, or tin; alternatively, lithium, sodium, potassium, magnesium, calcium, zinc, boron, aluminum, or tin; alternatively, lithium, sodium, or potassium; alternatively, magnesium or calcium; alternatively, lithium; alternatively, sodium; alternatively, potassium; alternatively, magnesium; alternatively, calcium; alternatively, zinc; alternatively, boron; alternatively, aluminum; or alternatively, tin. In some aspects, the metal hydrocarbyl or metal alkyl, with or without a halide, can comprise a lithium hydrocarbyl or alkyl, a magnesium hydrocarbyl or alkyl, a boron hydrocarbyl or alkyl, a zinc hydrocarbyl or alkyl, or an aluminum hydrocarbyl or alkyl.

In particular aspects, the co-catalyst can comprise an aluminoxane compound, an organoboron or organoborate compound, an ionizing ionic compound, an organoaluminum compound, an organozinc compound, an organomagnesium compound, or an organolithium compound, and this includes any combinations of these materials. In one aspect, the co-catalyst can comprise an organoaluminum compound. In another aspect, the co-catalyst can comprise an aluminoxane compound, an organoboron or organoborate compound, an ionizing ionic compound, an organozinc compound, an organomagnesium compound, an organolithium compound, or any combination thereof. In yet another aspect, the co-catalyst can comprise an aluminoxane compound; alternatively, an organoboron or organoborate compound; alternatively, an ionizing ionic compound; alternatively, an organozinc compound; alternatively, an organomagnesium compound; or alternatively, an organolithium compound.

Specific non-limiting examples of suitable organoaluminum compounds can include trimethylaluminum (TMA), triethylaluminum (TEA), tri-n-propylaluminum (TNPA), tri-n-butylaluminum (TNBA), triisobutylaluminum (TIBA), tri-n-hexylaluminum, tri-n-octylaluminum, diisobutylaluminum hydride, diethylaluminum ethoxide, diethylaluminum chloride, and the like, or combinations thereof. Representative and non-limiting examples of aluminoxanes include methylaluminoxane, modified methylaluminoxane, ethylaluminoxane, n-propylaluminoxane, iso-propylaluminoxane, n-butylaluminoxane, t-butylaluminoxane, sec-butylaluminoxane, iso-butylaluminoxane, 1-pentylaluminoxane, 2-pentylaluminoxane, 3-pentylaluminoxane, isopentylaluminoxane, neopentylaluminoxane, and the like, or any combination thereof. Representative and non-limiting examples of organoboron/organoborate compounds include N,N-dimethylanilinium tetrakis(pentafluorophenyl)borate, triphenylcarbenium tetrakis(pentafluorophenyl)borate, lithium tetrakis(pentafluorophenyl)borate, N,N-dimethylanilinium tetrakis[3,5-bis(trifluoromethyl)phenyl]borate, triphenylcarbenium tetrakis[3,5-bis(trifluoromethyl)phenyl]borate, tris(pentafluorophenyl)boron, tris[3,5-bis(trifluoromethyl)phenyl]boron, and the like, or mixtures thereof.

Examples of ionizing ionic compounds can include, but are not limited to, the following compounds: tri(n-butyl) ammonium tetrakis(p-tolyl)borate, tri(n-butyl) ammonium tetrakis(m-tolyl)borate, tri(n-butyl)ammonium tetrakis(2,4-dimethylphenyl)borate, tri(n-butyl)ammonium tetrakis(3,5-dimethyl phenyl)borate, tri(n-butyl)ammonium tetrakis[3,5-bis(trifluoromethyl)phenyl]borate, tri(n-butyl)ammonium tetrakis(pentafluorophenyl)borate, N,N-dimethylanilinium tetrakis(p-tolyl)borate, N,N-dimethylanilinium tetrakis(m-tolyl)borate, N,N-dimethylanilinium tetrakis(2,4-dimethylphenyl)borate, N,N-dimethylanilinium tetrakis(3,5-dimethyl-phenyl)borate, N,N-dimethylanilinium tetrakis[3,5-bis(trifluoromethyl)phenyl]borate, N,N-dimethylanilinium tetrakis(pentafluorophenyl)borate, triphenylcarbenium tetrakis(p-tolyl)borate, triphenylcarbenium tetrakis(m-tolyl)borate, triphenylcarbenium tetrakis(2,4-dimethylphenyl)borate, triphenylcarbenium tetrakis(3,5-dimethylphenyl) borate, triphenylcarbenium tetrakis[3,5-bis(trifluoromethyl)phenyl]borate, triphenylcarbenium tetrakis (pentafluorophenyl)borate, tropylium tetrakis(p-tolyl) borate, tropylium tetrakis(m-tolyl)borate, tropylium tetrakis(2,4-dimethylphenyl)borate, tropylium tetrakis(3,5- dimethylphenyl)borate, tropylium tetrakis[3,5-bis(trifluoromethyl)phenyl]borate, tropylium tetrakis(pentafluorophenyl) borate, lithium tetrakis(pentafluorophenyl)borate, lithium tetraphenylborate, lithium tetrakis(p-tolyl)borate, lithium tetrakis(m-tolyl)borate, lithium tetrakis(2,4-dimethylphenyl)borate, lithium tetrakis(3,5-dimethylphenyl)borate, lithium tetrafluoroborate, sodium tetrakis(pentafluorophenyl)borate, sodium tetraphenylborate, sodium tetrakis(p-tolyl)borate, sodium tetrakis(m-tolyl)borate, sodium tetrakis(2,4-dimethylphenyl)borate, sodium tetrakis(3,5-dimethylphenyl)borate, sodium tetrafluoroborate, potassium tetrakis(pentafluorophenyl)borate, potassium tetraphenylborate, potassium tetrakis(p-tolyl)borate, potassium tetrakis(m-tolyl)borate, potassium tetrakis(2,4-dimethylphenyl)borate, potassium tetrakis(3,5-dimethylphenyl)borate, potassium tetrafluoroborate, lithium tetrakis(pentafluorophenyl)aluminate, lithium tetraphenylaluminate, lithium tetrakis(p-tolyl)aluminate, lithium tetrakis(m-tolyl)aluminate, lithium tetrakis(2,4-dimethylphenyl)aluminate, lithium tetrakis(3,5-dimethylphenyl)aluminate, lithium tetrafluoroaluminate, sodium tetrakis(pentafluorophenyl)aluminate, sodium tetraphenylaluminate, sodium tetrakis(p-tolyl)aluminate, sodium tetrakis(m-tolyl)aluminate, sodium tetrakis (2,4-dimethylphenyl)aluminate, sodium tetrakis(3,5-dimethylphenyl)aluminate, sodium tetrafluoroaluminate, potassium tetrakis(pentafluorophenyl)aluminate, potassium tetraphenylaluminate, potassium tetrakis(p-tolyl)aluminate, potassium tetrakis(m-tolyl)aluminate, potassium tetrakis(2, 4-dimethylphenyl)aluminate, potassium tetrakis (3,5-dimethylphenyl)aluminate, potassium tetrafluoroaluminate, and the like, or combinations thereof.

Exemplary organozinc compounds which can be used as co-catalysts can include, but are not limited to, dimethylzinc, diethylzinc, dipropylzinc, dibutylzinc, dineopentylzinc, di(trimethylsilyl)zinc, di(triethylsilyl)zinc, di(triisoproplysilyl)zinc, di(triphenylsilyl)zinc, di(allyldimethylsilyl)zinc, di(trimethylsilylmethyl)zinc, and the like, or combinations thereof.

Similarly, exemplary organomagnesium compounds can include, but are not limited to, dimethylmagnesium, diethylmagnesium, dipropylmagnesium, dibutylmagnesium, dineopentylmagnesium, di(trimethylsilylmethyl)magnesium, methylmagnesium chloride, ethylmagnesium chloride, propylmagnesium chloride, butylmagnesium chloride, neopentylmagnesium chloride, trimethylsilylmethylmagnesium chloride, methylmagnesium bromide, ethylmagnesium bromide, propylmagnesium bromide, butylmagnesium bromide, neopentylmagnesium bromide, trimethylsilylmethylmagnesium bromide, methylmagnesium iodide, ethylmagnesium iodide, propylmagnesium iodide, butylmagnesium iodide, neopentylmagnesium iodide, trimethylsilylmethylmagnesium iodide, methylmagnesium ethoxide, ethylmagnesium ethoxide, propylmagnesium ethoxide, butylmagnesium ethoxide, neopentylmagnesium ethoxide, trimethylsilylmethylmagnesium ethoxide, methylmagnesium propoxide, ethylmagnesium propoxide, propylmagnesium propoxide, butylmagnesium propoxide, neopentylmagnesium propoxide, trimethylsilylmethylmagnesium propoxide, methylmagnesium phenoxide, ethylmagnesium phenoxide, propylmagnesium phenoxide, butylmagnesium phenoxide, neopentylmagnesium phenoxide, trimethylsilylmethylmagnesium phenoxide, and the like, or any combinations thereof.

Likewise, exemplary organolithium compounds can include, but are not limited to, methyllithium, ethyllithium, propyllithium, butyllithium (e.g., t-butyllithium), neopentyllithium, trimethylsilylmethyllithium, phenyllithium, tolyllithium, xylyllithium, benzyllithium, (dimethylphenyl)methyllithium, allyllithium, and the like, or combinations thereof.

Co-catalysts that can be used in the catalyst compositions of this invention are not limited to the co-catalysts described above. Other suitable co-catalysts are well known to those of skill in the art including, for example, those disclosed in U.S. Pat. Nos. 3,242,099, 4,794,096, 4,808,561, 5,576,259, 5,807,938, 5,919,983, 7,294,599 7,601,665, 7,884,163, 8,114,946, and 8,309,485, which are incorporated herein by reference in their entirety.

While not limited thereto, the weight ratio of the co-catalyst to the supported catalyst often can be in a range from about 10:1 to about 1:1000. If more than one co-catalyst and/or more than one supported catalyst are employed, this ratio is based on the total weight of each respective component. In another aspect, the weight ratio of the co-catalyst to the supported catalyst can be in a range from about 5:1 to about 1:500, from about 3:1 to about 1:100, from about 1:1 to about 1:100, or from about 1:1 to about 1:50.

Catalyst compositions of the present invention have unexpectedly high catalyst activity. Generally, the catalyst compositions have a catalyst activity greater than about 1,000 grams of ethylene polymer (homopolymer, copolymer, etc., as the context requires) per gram of the titanium alkoxymagnesium halide supported catalyst per hour (abbreviated g/g/hr). In another aspect, the catalyst activity can be greater than about 3,000, greater than about 5,000, or greater than about 10,000 g/g/hr. In still another aspect, catalyst compositions containing titanium alkoxymagnesium halide supported catalysts of this invention can be characterized by having a catalyst activity greater than about 15,000, or greater than about 20,000 g/g/hr, and often can range up to 35,000-40,000 g/g/hr. These activities are measured under slurry polymerization conditions, with a triethylaluminum co-catalyst, using isobutane as the diluent, at a polymerization temperature of 90° C. and a reactor pressure of about 430 psig.

Beneficially, the disclosed catalyst compositions—containing a titanium alkoxymagnesium halide supported catalyst—have an unexpectedly high response to the addition of hydrogen. For instance, the catalyst compositions can be characterized by a relatively high slope of a plot of the logarithm of melt index versus the logarithm of $[H_2]/[C_2]$.

Olefin Monomers

Unsaturated reactants that can be employed with catalyst compositions and polymerization processes of this invention typically can include olefin compounds having from 2 to 30 carbon atoms per molecule and having at least one olefinic double bond. This invention encompasses homopolymerization processes using a single olefin such as ethylene or propylene, as well as copolymerization, terpolymerization, etc., reactions using an olefin monomer with at least one different olefinic compound. For example, the resultant ethylene copolymers, terpolymers, etc., generally can contain a major amount of ethylene (>50 mole percent) and a minor amount of comonomer (<50 mole percent), though this is not a requirement. Comonomers that can be copolymerized with ethylene often can have from 3 to 20 carbon atoms, or from 3 to 10 carbon atoms, in their molecular chain.

Acyclic, cyclic, polycyclic, terminal (α), internal, linear, branched, substituted, unsubstituted, functionalized, and non-functionalized olefins can be employed in this invention. For example, typical unsaturated compounds that can be polymerized with the catalyst compositions of this invention can include, but are not limited to, ethylene, propylene, 1-butene, 2-butene, 3-methyl-1-butene, isobutylene, 1-pentene, 2-pentene, 3-methyl-1-pentene, 4-methyl-1-pentene, 1-hexene, 2-hexene, 3-hexene, 3-ethyl-1-hexene, 1-heptene, 2-heptene, 3-heptene, the four normal octenes (e.g., 1-octene), the four normal nonenes, the five normal decenes, and the like, or mixtures of two or more of these compounds. Cyclic and bicyclic olefins, including but not limited to, cyclopentene, cyclohexene, norbornylene, norbornadiene, and the like, also can be polymerized as described herein. Styrene can also be employed as a monomer in the present invention. In an aspect, the olefin monomer can comprise a $C_2$-$C_{20}$ olefin; alternatively, a $C_2$-$C_{20}$ alpha-olefin; alternatively, a $C_2$-$C_{10}$ olefin; alternatively, a $C_2$-$C_{10}$ alpha-olefin; alternatively, the olefin monomer can comprise ethylene; or alternatively, the olefin monomer can comprise propylene.

When a copolymer (or alternatively, a terpolymer) is desired, the olefin monomer and the olefin comonomer independently can comprise, for example, a $C_2$-$C_{20}$ alpha-olefin. In some aspects, the olefin monomer can comprise ethylene or propylene, which is copolymerized with at least one comonomer (e.g., a $C_2$-$C_{20}$ alpha-olefin, a $C_3$-$C_{20}$ alpha-olefin, etc.). According to one aspect of this invention, the olefin monomer used in the polymerization process can comprise ethylene. In this aspect, examples of suitable olefin comonomers can include, but are not limited to, propylene, 1-butene, 2-butene, 3-methyl-1-butene, isobutylene, 1-pentene, 2-pentene, 3-methyl-1-pentene, 4-methyl-1-pentene, 1-hexene, 2-hexene, 3-ethyl-1-hexene, 1-heptene, 2-heptene, 3-heptene, 1-octene, 1-decene, styrene, and the like, or combinations thereof. According to another aspect of the present invention, the olefin monomer can comprise ethylene, and the comonomer can comprise a $C_3$-$C_{10}$ alpha-olefin; alternatively, the comonomer can comprise 1-butene, 1-pentene, 1-hexene, 1-octene, 1-decene, styrene, or any combination thereof alternatively, the comonomer can comprise 1-butene, 1-hexene, 1-octene, or any combination thereof alternatively, the comonomer can comprise 1-butene; alternatively, the comonomer can comprise 1-hexene; or alternatively, the comonomer can comprise 1-octene.

Generally, the amount of comonomer introduced into a polymerization reactor system to produce a copolymer can be from about 0.01 to about 50 weight percent of the comonomer based on the total weight of the monomer and comonomer. According to another aspect of the present invention, the amount of comonomer introduced into a polymerization reactor system can be from about 0.01 to about 40 weight percent comonomer based on the total weight of the monomer and comonomer. In still another aspect, the amount of comonomer introduced into a polymerization reactor system can be from about 0.1 to about 35 weight percent comonomer based on the total weight of the monomer and comonomer. Yet, in another aspect, the amount of comonomer introduced into a polymerization reactor system can be from about 0.5 to about 20 weight percent comonomer based on the total weight of the monomer and comonomer.

While not intending to be bound by this theory, where branched, substituted, or functionalized olefins are used as reactants, it is believed that a steric hindrance can impede and/or slow the polymerization process. Thus, branched and/or cyclic portion(s) of the olefin removed somewhat from the carbon-carbon double bond would not be expected to hinder the reaction in the way that the same olefin substituents situated more proximate to the carbon-carbon double bond might.

According to one aspect of the present invention, at least one monomer/reactant can be ethylene (or propylene), so the polymerization reaction can be a homopolymerization involving only ethylene (or propylene), or a copolymerization with a different acyclic, cyclic, terminal, internal, linear, branched, substituted, or unsubstituted olefin. In addition, the catalyst compositions of this invention can be used in the polymerization of diolefin compounds including, but not limited to, 1,3-butadiene, isoprene, 1,4-pentadiene, and 1,5-hexadiene.

Polymerization Processes

Catalyst compositions of the present invention can be used to polymerize olefins to form homopolymers, copolymers, terpolymers, and the like. One such process for polymerizing olefins in the presence of a catalyst composition of the present invention can comprise contacting the catalyst composition with an olefin monomer and optionally an olefin comonomer (one or more) in a polymerization reactor system under polymerization conditions to produce an olefin polymer, wherein the catalyst composition can comprise any of the catalyst compositions described herein, and/or the catalyst composition can be produced by any of the processes for preparing catalyst compositions described herein. For instance, the catalyst composition can comprise a titanium alkoxymagnesium halide supported catalyst and a co-catalyst. The components of the catalyst compositions are described herein.

The catalyst compositions of the present invention are intended for any olefin polymerization method using various types of polymerization reactor systems and reactors. The polymerization reactor system can include any polymerization reactor capable of polymerizing olefin monomers and comonomers (one or more than one comonomer) to produce homopolymers, copolymers, terpolymers, and the like. The various types of reactors include those that can be referred to as a batch reactor, slurry reactor, gas-phase reactor, solution reactor, high pressure reactor, tubular reactor, autoclave reactor, and the like, or combinations thereof. Suitable polymerization conditions are used for the various reactor types. Gas phase reactors can comprise fluidized bed reactors or staged horizontal reactors. Slurry reactors can comprise vertical or horizontal loops. High pressure reactors can comprise autoclave or tubular reactors. Reactor types can include batch or continuous processes. Continuous processes can use intermittent or continuous product discharge. Processes can also include partial or full direct recycle of unreacted monomer, unreacted comonomer, and/or diluent.

Polymerization reactor systems of the present invention can comprise one type of reactor in a system or multiple reactors of the same or different type (e.g., a single reactor, dual reactor, more than two reactors). Production of polymers in multiple reactors can include several stages in at least two separate polymerization reactors interconnected by a transfer device making it possible to transfer the polymers resulting from the first polymerization reactor into the second reactor. The desired polymerization conditions in one of the reactors can be different from the operating conditions of the other reactor(s). Alternatively, polymerization in multiple reactors can include the manual transfer of polymer from one reactor to subsequent reactors for continued polymerization. Multiple reactor systems can include any combination including, but not limited to, multiple loop reactors, multiple gas phase reactors, a combination of loop and gas phase reactors, multiple high pressure reactors, or a combination of high pressure with loop and/or gas phase reactors. The multiple reactors can be operated in series, in parallel, or both. Accordingly, the present invention encompasses polymerization reactor systems comprising a single reactor, comprising two reactors, and comprising more than two reactors. The polymerization reactor system can comprise a slurry reactor, a gas-phase reactor, a solution reactor, in certain aspects of this invention, as well as multi-reactor combinations thereof.

According to one aspect of the invention, the polymerization reactor system can comprise at least one loop slurry reactor comprising vertical or horizontal loops. Monomer, diluent, catalyst, and comonomer can be continuously fed to a loop reactor where polymerization occurs. Generally, continuous processes can comprise the continuous introduction of monomer/comonomer, a catalyst, and a diluent into a polymerization reactor and the continuous removal from this reactor of a suspension comprising polymer particles and the diluent. Reactor effluent can be flashed to remove the solid polymer from the liquids that comprise the diluent, monomer and/or comonomer. Various technologies can be used for this separation step including, but not limited to, flashing that can include any combination of heat addition and pressure reduction, separation by cyclonic action in either a cyclone or hydrocyclone, or separation by centrifugation.

A typical slurry polymerization process (also known as the particle form process) is disclosed, for example, in U.S. Pat. Nos. 3,248,179, 4,501,885, 5,565,175, 5,575,979, 6,239,235, 6,262,191, 6,833,415, and 8,822,608, each of which is incorporated herein by reference in its entirety.

Suitable diluents used in slurry polymerization include, but are not limited to, the monomer being polymerized and hydrocarbons that are liquids under reaction conditions. Examples of suitable diluents include, but are not limited to, hydrocarbons such as propane, cyclohexane, isobutane, n-butane, n-pentane, isopentane, neopentane, and n-hexane. Some loop polymerization reactions can occur under bulk conditions where no diluent is used, such as can be employed in the bulk polymerization of propylene to form polypropylene homopolymers.

According to yet another aspect, the polymerization reactor system can comprise at least one gas phase reactor (e.g., a fluidized bed reactor). Such reactor systems can employ a continuous recycle stream containing one or more monomers continuously cycled through a fluidized bed in the presence of the catalyst under polymerization conditions. A recycle stream can be withdrawn from the fluidized bed and recycled back into the reactor. Simultaneously, an ethylene polymer effluent stream can be withdrawn from the reactor and new or fresh monomer can be added to replace the polymerized monomer. Such gas phase reactors can comprise a process for multi-step gas-phase polymerization of olefins, in which olefins are polymerized in the gaseous phase in at least two independent gas-phase polymerization zones while feeding a catalyst-containing polymer formed in a first polymerization zone to a second polymerization zone. One type of gas phase reactor is disclosed in U.S. Pat. Nos. 5,352,749, 4,588,790, 5,436,304, 7,531,606, and 7,598,327, each of which is incorporated by reference in its entirety herein.

According to still another aspect of the invention, a high pressure polymerization reactor can comprise a tubular reactor or an autoclave reactor. Tubular reactors can have several zones where fresh monomer, initiators, or catalysts are added. Monomer can be entrained in an inert gaseous stream and introduced at one zone of the reactor. Initiators, catalysts, and/or catalyst components can be entrained in a gaseous stream and introduced at another zone of the reactor. The gas streams can be intermixed for polymerization. Heat and pressure can be employed appropriately to obtain optimal polymerization reaction conditions.

According to yet another aspect of the invention, the polymerization reactor system can comprise a solution polymerization reactor wherein the monomer (and comonomer, if used) are contacted with the catalyst composition by suitable stirring or other means. A carrier comprising an inert organic diluent or excess monomer can be employed. If desired, the monomer/comonomer can be brought in the vapor phase into contact with the catalytic reaction product, in the presence or absence of liquid material. The polymerization zone is maintained at temperatures and pressures that will result in the formation of a solution of the polymer in a reaction medium. Agitation can be employed to obtain better temperature control and to maintain uniform polymerization mixtures throughout the polymerization zone. Adequate means are utilized for dissipating the exothermic heat of polymerization.

Polymerization reactor systems suitable for the present invention can further comprise any combination of at least one raw material feed system, at least one feed system for catalyst or catalyst components, and/or at least one polymer recovery system. Suitable reactor systems for the present invention can further comprise systems for feedstock purification, catalyst storage and preparation, extrusion, reactor cooling, polymer recovery, fractionation, recycle, storage, loadout, laboratory analysis, and process control.

Polymerization conditions that are controlled for efficiency and to provide desired polymer properties can include temperature, pressure, and the concentrations of various reactants. Polymerization temperature can affect catalyst productivity, polymer molecular weight, and molecular weight distribution. A suitable polymerization temperature can be any temperature below the de-polymerization temperature according to the Gibbs Free energy equation. Typically, this includes from about 60° C. to about 280° C., for example, or from about 60° C. to about 120° C., depending upon the type of polymerization reactor(s). In some reactor systems, the polymerization temperature generally can fall within a range from about 70° C. to about 100° C., or from about 75° C. to about 95° C. Various polymerization conditions can be held substantially constant, for example, for the production of a particular grade of olefin polymer.

Suitable pressures will also vary according to the reactor and polymerization type. The pressure for liquid phase polymerizations in a loop reactor is typically less than 1000 psig (6.9 MPa). Pressure for gas phase polymerization is usually at about 200 to 500 psig (1.4 MPa to 3.4 MPa). High pressure polymerization in tubular or autoclave reactors is generally run at about 20,000 to 75,000 psig (138 to 517 MPa). Polymerization reactors can also be operated in a supercritical region occurring at generally higher temperatures and pressures. Operation above the critical point of a pressure/temperature diagram (supercritical phase) may offer advantages.

Aspects of this invention also are directed to olefin polymerization processes conducted in the absence of added hydrogen. An olefin polymerization process of this invention can comprise contacting a catalyst composition (i.e., any catalyst composition disclosed herein) with an olefin monomer and optionally an olefin comonomer in a polymerization reactor system under polymerization conditions to produce an olefin polymer, wherein the polymerization process is conducted in the absence of added hydrogen (no hydrogen is added to the polymerization reactor system). As one of ordinary skill in the art would recognize, hydrogen can be generated in-situ by catalyst compositions in various olefin polymerization processes, and the amount generated can vary depending upon the specific catalyst components employed, the type of polymerization process used, the polymerization reaction conditions utilized, and so forth.

In other aspects, it may be desirable to conduct the polymerization process in the presence of a certain amount of added hydrogen. Accordingly, an olefin polymerization process of this invention can comprise contacting a catalyst composition (i.e., any catalyst composition disclosed herein) with an olefin monomer and optionally an olefin comonomer in a polymerization reactor system under polymerization conditions to produce an olefin polymer, wherein the polymerization process is conducted in the presence of added hydrogen (hydrogen is added to the polymerization reactor system). For example, the ratio of hydrogen to the olefin monomer in the polymerization process can be controlled, often by the feed ratio of hydrogen to the olefin monomer entering the reactor. The added hydrogen to olefin monomer ratio in the process can be controlled at a weight ratio which falls within a range from about 25 ppm to about 1500 ppm, from about 50 to about 1000 ppm, or from about 100 ppm to about 750 ppm.

In some aspects of this invention, the feed or reactant ratio of hydrogen to olefin monomer can be maintained substantially constant during the polymerization run for a particular polymer grade. That is, the hydrogen:olefin monomer ratio can be selected at a particular ratio within a range from about 5 ppm up to about 1000 ppm or so, and maintained at the ratio to within about +/−25% during the polymerization run. For instance, if the target ratio is 100 ppm, then maintaining the hydrogen:olefin monomer ratio substantially constant would entail maintaining the feed ratio between about 75 ppm and about 125 ppm. Further, the addition of comonomer (or comonomers) can be, and generally is, substantially constant throughout the polymerization run for a particular polymer grade.

However, in other aspects, it is contemplated that monomer, comonomer (or comonomers), and/or hydrogen can be periodically pulsed to the reactor, for instance, in a manner similar to that employed in U.S. Pat. No. 5,739,220 and U.S. Patent Publication No. 2004/0059070, the disclosures of which are incorporated herein by reference in their entirety.

The concentration of the reactants entering the polymerization reactor system can be controlled to produce resins with certain physical and mechanical properties. The proposed end-use product that will be formed by the polymer resin and the method of forming that product ultimately can determine the desired polymer properties and attributes. Mechanical properties include tensile, flexural, impact, creep, stress relaxation, and hardness tests. Physical properties include density, molecular weight, molecular weight distribution, melting temperature, glass transition temperature, temperature melt of crystallization, density, stereoregularity, crack growth, long chain branching, and rheological measurements.

This invention is also directed to, and encompasses, the olefin polymers (e.g., ethylene homopolymers and ethylene/α-olefin copolymers) produced by any of the polymerization processes disclosed herein. Articles of manufacture can be formed from, and/or can comprise, the polymers produced in accordance with this invention.

Polymers and Articles

Generally, olefin polymers encompassed herein can include any polymer produced from any olefin monomer and comonomer(s) described herein. For example, the olefin polymer can comprise an ethylene homopolymer, a propylene homopolymer, an ethylene copolymer (e.g., ethylene/α-olefin, ethylene/1-butene, ethylene/1-hexene, ethylene/1-octene, etc.), a propylene-based copolymer, an ethylene terpolymer, a propylene terpolymer, and the like, including combinations thereof. In one aspect, the olefin polymer can comprise an ethylene homopolymer, an ethylene/1-butene copolymer, an ethylene/1-hexene copolymer, an ethylene/1-octene copolymer, or any combination thereof, while in another aspect, the olefin polymer can comprise an ethylene/1-hexene copolymer.

If the resultant polymer produced in accordance with the present invention is, for example, an ethylene polymer, its properties can be characterized by various analytical techniques known and used in the polyolefin industry. Articles of manufacture can be formed from, and/or can comprise, the ethylene polymers of this invention, whose typical properties are provided below.

Polymers of ethylene (homopolymers, copolymers, etc.) produced in accordance with some aspects of this invention generally can have a melt index (MI) from 0 to about 10 g/10 min. Melt indices in the range from 0 to about 5, from 0 to about 2, from 0 to about 1, or from 0 to about 0.5 g/10 min, are contemplated in other aspects of this invention. For example, a polymer of the present invention can have a MI in a range from 0 to about 3.5, or from 0 to about 1.5 g/10 min.

Consistent with certain aspects of this invention, ethylene polymers described herein can have a high load melt index (HLMI) in a range from 0 to about 100, from 0 to about 50, from 0 to about 25, or from 0 to about 10 g/10 min. In further aspects, ethylene polymers described herein can have a HLMI in a range from 0 to about 20, from 0 to about 8, or from 0 to about 3 g/10 min.

The densities of ethylene-based polymers (e.g., ethylene homopolymers, ethylene copolymers) produced using the catalyst systems and processes disclosed herein often are less than or equal to about 0.96 g/cm$^3$, for example, less than or equal to about 0.945 g/cm$^3$, and often can range down to about 0.895 g/cm$^3$. Yet, in particular aspects, the density can be in a range from about 0.90 to about 0.96, such as, for example, from about 0.90 to about 0.95, from about 0.91 to about 0.945, from about 0.91 to about 0.94, from about 0.92 to about 0.95, or from about 0.915 to about 0.935 g/cm$^3$.

In an aspect, ethylene polymers described herein can have a ratio of Mw/Mn, or the polydispersity index, in a range from about 2 to about 10, from about 2 to about 9, from about 3 to about 10, from about 3 to about 9, or from about 3.5 to about 10. In another aspect, ethylene polymers described herein can have a Mw/Mn in a range from about 3.5 to about 9, from about 3.5 to about 8, from about 3.5 to about 7, or from about 4 to about 8.

In an aspect, ethylene polymers described herein can have a ratio of Mz/Mw in a range from about 1.5 to about 5, from about 1.5 to about 4, from about 1.5 to about 3.5, or from about 1.7 to about 5. In another aspect, ethylene polymers described herein can have a Mz/Mw in a range from about 1.7 to about 4.5, from about 1.7 to about 4, from about 2 to about 4.5, or from about 2 to about 3.5.

In an aspect, ethylene polymers described herein can have a weight-average molecular weight (Mw) in a range from about 100,000 to about 2,500,000, from about 150,000 to about 2,500,000, from about 150,000 to about 2,000,000, from about 200,000 to about 2,500,000, or from about 200,000 to about 2,000,000 g/mol. Additionally or alternatively, ethylene polymers described herein can have a number-average molecular weight (Mn) in a range from about 15,000 to about 1,000,000, from about 20,000 to about 600,000, from about 30,000 to about 500,000, or from about 40,000 to about 400,000 g/mol. Additionally or alternatively, ethylene polymers described herein can have a z-average molecular weight (Mz) in a range from about 400,000 to about 4,500,000, from about 400,000 to about 4,000,000, from about 700,000 to about 4,000,000, or from about 1,00,000 to about 3,800,000 g/mol.

Olefin polymers, whether homopolymers, copolymers, and so forth, can be formed into various articles of manufacture. Articles which can comprise polymers of this invention include, but are not limited to, an agricultural film, an automobile part, a bottle, a container for chemicals, a drum, a fiber or fabric, a food packaging film or container, a food service article, a fuel tank, a geomembrane, a household container, a liner, a molded product, a medical device or material, an outdoor storage product, outdoor play equipment, a pipe, a sheet or tape, a toy, or a traffic barrier, and the like. Various processes can be employed to form these articles. Non-limiting examples of these processes include injection molding, blow molding, rotational molding, film extrusion, sheet extrusion, profile extrusion, thermoforming, and the like. Additionally, additives and modifiers are often added to these polymers in order to provide beneficial polymer processing or end-use product attributes. Such processes and materials are described in *Modern Plastics Encyclopedia*, Mid-November 1995 Issue, Vol. 72, No. 12; and *Film Extrusion Manual—Process, Materials, Properties*, TAPPI Press, 1992; the disclosures of which are incorporated herein by reference in their entirety. In some aspects of this invention, an article of manufacture can comprise any of ethylene polymers described herein, and the article of manufacture can be a film product or a molded product.

Applicant also contemplates a method for forming or preparing an article of manufacture comprising a polymer produced by any of the polymerization processes disclosed herein. For instance, a method can comprise (i) contacting a catalyst composition with an olefin monomer and an optional olefin comonomer under polymerization conditions in a polymerization reactor system to produce an olefin polymer, wherein the catalyst composition can comprise a supported catalyst and a co-catalyst (e.g., an organoaluminum compound); and (ii) forming an article of manufacture comprising the olefin polymer. The forming step can comprise blending, melt processing, extruding, molding, or thermoforming, and the like, including combinations thereof.

EXAMPLES

The invention is further illustrated by the following examples, which are not to be construed in any way as imposing limitations to the scope of this invention. Various other aspects, embodiments, modifications, and equivalents thereof which, after reading the description herein, may suggest themselves to one of ordinary skill in the art without departing from the spirit of the present invention or the scope of the appended claims.

Melt index (MI, g/10 min) was determined in accordance with ASTM D1238 at 190° C. with a 2.16 kg weight, $I_{10}$ (g/10 min) was determined in accordance with ASTM D1238 at 190° C. with a 10 kg weight, and high load melt index (HLMI, g/10 min) was determined in accordance with ASTM D1238 at 190° C. with a 21.6 kg weight. Polymer density was determined in grams per cubic centimeter (g/cm$^3$) on a compression molded sample, cooled at about 15° C. per hour, and conditioned for about 40 hours at room temperature in accordance with ASTM D1505 and ASTM D4703.

Powder x-ray diffraction analyses and lattice spacing measurements were performed using capillary samples measured on a Bruker Kappa goniometer equipped with a Bruker Vantec 500 detector. The x-ray source was a Microstar rotating anode 0.1×1 mm focus, 45 kV 50 mA, using an Incoatec MX mirror (double bounce, focus on sample), and the beam divergence was reduced with a 3 mrad collimator. 2D Images from different 2theta positions were merged and integrated using Diffrac.Eva V 4.3 software. Data is presented as measured, with no subtraction of background or normalized intensities.

The preparation procedure for Experimental Catalyst A was as follows. In an air-free nitrogen atmosphere Buchi glass stirred tank reactor attached to a temperature control oil bath, 250 mL of toluene and 20 mL of 1M MgBu$_2$ (0.02 mol) were stirred at 500 rpm via an overhead stirrer and heated to 55° C. Approximately 0.6 equivalents of 1-octanol (2 mL, 0.0127 mol) were then added dropwise, and a mild exotherm was observed (temperature increased to about 61° C.). After alcohol addition, the oil bath temperature was maintained at 60° C. and the mixture was stirred for 2 hr. Next, the reaction mixture was cooled to 15° C. and 0.8 equivalents of SiCl$_4$ (1.8 mL, 0.0157 mol) were rapidly added, after which the mixture was returned to 60° C. and stirred for 2 hr. A fine white microcrystalline precipitate formed, stirring was stopped, and the resulting slurry was transferred to a capped bottle and centrifuged. The supernatant liquid was removed and the solid was washed with heptane (2×100 mL), and then suspended in heptane (100 mL). Approximately 6 mL of TiCl$_4$ (0.055 mol, 2.8 equivalents) were added and the slurry was agitated, and then heated to 80° C. for 2 hr. Instead of TiCl$_4$, a titanium source such as TiOiPr$_4$ can be used. The slurry was centrifuged and the supernatant liquid was removed, followed by washing with heptane (3×100 mL). The solid was re-suspended in heptane (100 mL) and 6 mL of TiCl$_4$ (0.055 mol, 2.8 equivalents) were added. Then, the slurry was agitated and heated to 80° C. for 2 hr, followed again by centrifugation, removal of the supernatant, and washing with heptane (3×100 mL), yielding a solid catalyst of varying color depending on the alcohol used. The solid catalyst was dried by passing N$_2$ gas over it at room temperature, sometimes resulting in the formation of a solid cake which had to be broken apart manually.

Experimental Catalyst 1 and Experimental Catalyst 2 were synthesized in a manner similar to Experimental Catalyst A, with the following differences. Referring first to Experimental Catalyst 1, 22 mL of MgBuEt (0.09 M, 0.02 mol) were used instead of MgBu$_2$, 2.6 mL of dodecanol (0.012 mol, 0.6 equivalents) were used instead of octanol, and a slightly higher amount of SiCl$_4$ was used (1.9 mL, 0.0166 mol, 0.8 equivalents). Referring now to Experimental Catalyst 2, 22 mL of MgBuEt (0.09 M, 0.02 mol) were used instead of MgBu$_2$, 1.3 mL of pentanol (0.012 mol, 0.6 equivalents) were used instead of octanol, and a slightly higher amount of SiCl$_4$ was used (1.9 mL, 0.0166 mol, 0.8 equivalents).

Comparative Catalyst 1 was synthesized in a manner similar to Experimental Catalyst 1 and Experimental Catalyst 2, except that there was no alcohol addition step. The 22 mL of MgBuEt (0.09 M, 0.02 mol) were mixed with the SiCl$_4$ (1.9 mL, 0.0166 mol, 0.8 equivalents). MgCl$_2$ was obtained from SRC, and heated and dried under nitrogen prior to use.

Powder X-ray Diffraction (PXRD) analysis of a series of samples was used to illustrate the difference in lattice spacing depending upon the alcohol used in the support preparation. Table I summarize the data for Experimental Catalyst 1, Experimental Catalyst 2, Comparative Catalyst 1, and $MgCl_2$. It is readily apparent that changes to the alcohol used in the support preparation resulted in changes to the lattice spacing (the distance between crystalline planes) of the resulting support and catalyst crystal. As the length of the alkyl chain was decreased from 12 (dodecanol) to 5 (decanol) carbons, the lattice spacing decreased accordingly. Further, there is practically no difference between the catalyst prepared without using an alcohol additive during support preparation and the magnesium chloride control. This data illustrates that the nature of the alcohol used has a direct effect upon the resulting support structure, and therefore, upon the catalyst.

TABLE I

| Catalyst Example | Lattice Spacing d (nm) | Alcohol |
| --- | --- | --- |
| Experimental Catalyst 1 | 9.96 | 1-dodecanol |
| Experimental Catalyst 2 | 5.76 | 1-pentanol |
| Comparative Catalyst 1 | 3.05 | no alcohol |
| $MgCl_2$ | 2.99 | no alcohol or Ti |

For Experimental Catalyst A, Experimental Catalyst 1, Commercial Catalyst A, and Commercial Catalyst B, ethylene polymerization experiments were conducted in a one-gallon stainless steel reactor, and isobutane (1.8 L) was used in all runs. The supported titanium catalyst was activated by contact with triethylaluminum (TEA, 0.8-1 mL of a 1 M solution) in the reactor prior to exposure to ethylene. The contents of the reactor were stirred and heated to the desired run temperature of about 90° C., and ethylene and 1-hexene (if used) were then introduced into the reactor. Hydrogen (if used) was added from an auxiliary vessel and the pressure drop from the initial 600 psig starting pressure, based on ethylene addition, was noted. Ethylene was fed on demand to maintain the target pressure of ~350-450 psig pressure for duration of the polymerization run. The reactor was maintained at the desired temperature throughout the run by an automated heating-cooling system. After venting of the reactor, purging, and cooling, the resulting polymer product was dried under reduced pressure.

Commercial Catalyst A contained about 14-19 wt. % titanium compounds ($TiCl_3/TiCl_4$), about 17-24 wt. % $MgCl_2$, about 9-13 wt. % aluminum compounds, about 43-53 wt. % polyethylene, and less than about 3 wt. % heptane. The overall metal concentration for Ti was in the 3.5-5.9 wt. % range and for Mg was in the 4.1-5.8 wt. % range. Commercial Catalyst B contained titanium compounds ($TiCl_3/TiCl_4$), $MgCl_2$, and aluminum compounds totaling about 85-99 wt. %, and less than 15 wt. % of hexane.

Figure 2:
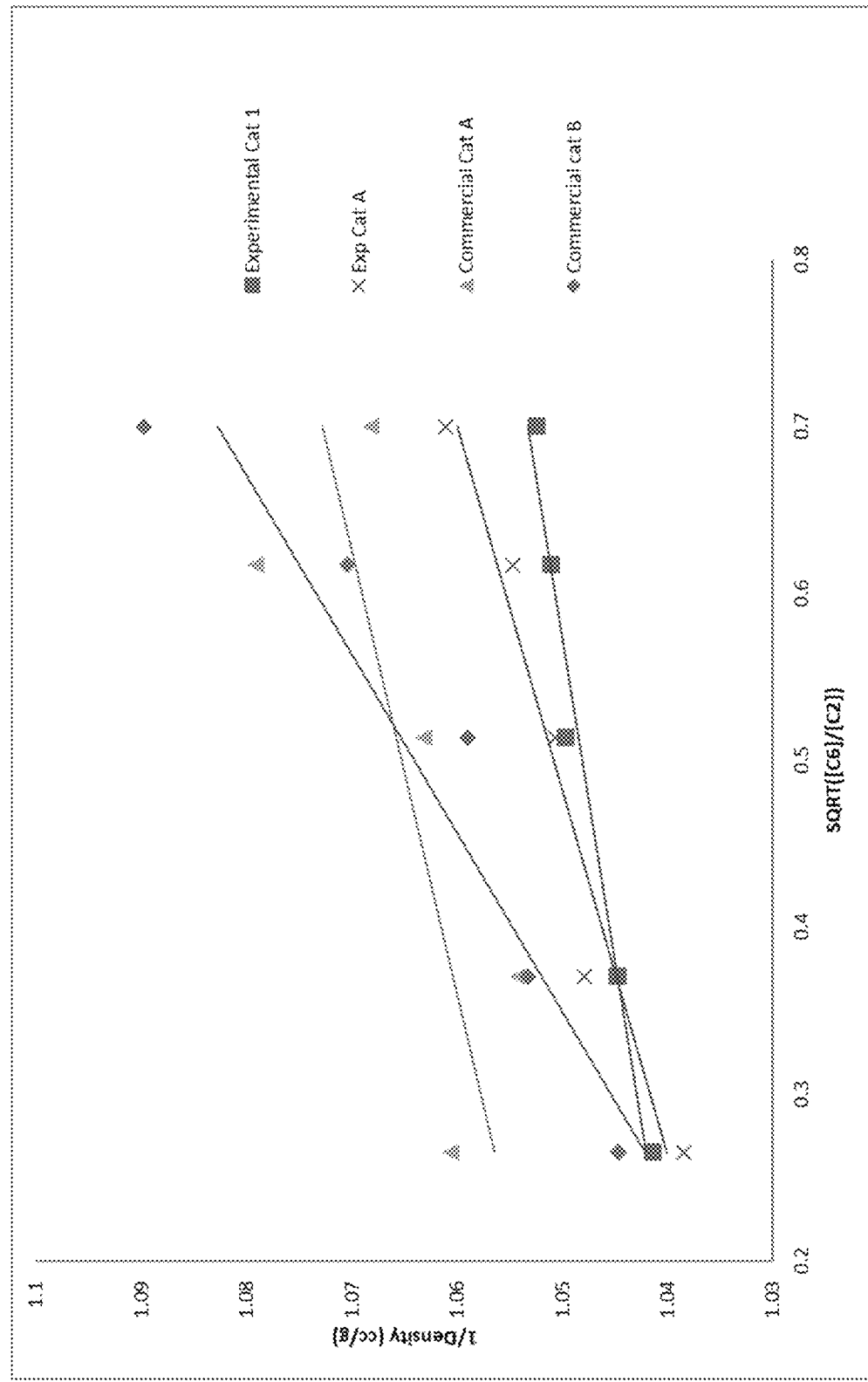
FIG. 2 presents a plot of the reciprocal of density versus the square root of $[C_6]/[C_2]$ for the polymers produced using Experimental Catalyst A, Experimental Catalyst 1, Commercial Catalyst A, and Commercial Catalyst B.

The polymerization experiments using Experimental Catalyst A, Experimental Catalyst 1, Commercial Catalyst A, and Commercial Catalyst B are summarized in Table II and FIG. 1 (hydrogen study) and Table III and FIG. 2 (olefin comonomer incorporation study). As shown by these tables and figures, the experimental catalysts possessed a comparable to higher response to hydrogen (larger change in melt index of the resulting polyethylene polymer under similar hydrogen concentration) than comparative commercial catalysts, while maintaining a high catalytic activity. Experimental Catalyst A had the highest hydrogen response. The 1-hexene incorporation study showed that the experimental supported titanium catalysts performed at a generally similar level to that of comparative commercial catalysts.

TABLE II

| Catalyst | Temp (° C.) | Ethylene (psig) | $H_2$ (delta psi) | $[C_2]$ (mole/L) | $[H_2]$ (mole/L) | Cat. Wt. (g) | TEA (mL) |
| --- | --- | --- | --- | --- | --- | --- | --- |
| Exp Cat A | 90 | 372 | 141 | 0.8317 | 0.024 | 0.0119 | 0.8 |
| Exp Cat A | 90 | 377 | 164 | 0.8317 | 0.028 | 0.0217 | 0.8 |
| Exp Cat A | 90 | 389 | 234 | 0.8317 | 0.04 | 0.0079 | 0.8 |
| Exp Cat A | 90 | 399 | 291 | 0.8317 | 0.05 | 0.0051 | 0.8 |
| Exp Cat A | 90 | 409 | 348 | 0.8317 | 0.06 | 0.0180 | 0.8 |
| Exp Cat A | 90 | 430 | 463 | 0.8317 | 0.08 | 0.0082 | 0.8 |
| Exp Cat A | 90 | 451 | 578 | 0.8317 | 0.1 | 0.0108 | 0.8 |
| Experimental Cat 1 | 90 | 430 | 463 | 0.8317 | 0.08 | 0.0226 | 0.8 |
| Experimental Cat 1 | 90 | 451 | 578 | 0.8317 | 0.1 | 0.0243 | 0.8 |
| Experimental Cat 1 | 90 | 409 | 348 | 0.8317 | 0.06 | 0.0387 | 0.8 |
| Experimental Cat 1 | 90 | 399 | 291 | 0.8317 | 0.05 | 0.0452 | 0.8 |
| Experimental Cat 1 | 90 | 389 | 233 | 0.8317 | 0.04 | 0.1650 | 0.8 |
| Experimental Cat 1 | 90 | 377 | 164 | 0.8317 | 0.028 | 0.0370 | 0.8 |
| Experimental Cat 1 | 90 | 372 | 141 | 0.8317 | 0.024 | 0.0246 | 0.8 |
| Commercial Cat A | 90 | 430 | 463 | 0.8317 | 0.08 | 0.0057 | 0.8 |
| Commercial Cat A | 90 | 451 | 578 | 0.8317 | 0.1 | 0.0068 | 0.8 |
| Commercial Cat A | 90 | 409 | 348 | 0.8317 | 0.06 | 0.0126 | 0.8 |
| Commercial Cat A | 90 | 399 | 291 | 0.8317 | 0.05 | 0.0053 | 0.8 |
| Commercial Cat A | 90 | 389 | 233 | 0.8317 | 0.04 | 0.0087 | 0.8 |
| Commercial Cat A | 90 | 377 | 164 | 0.8317 | 0.028 | 0.0098 | 0.8 |
| Commercial Cat A | 90 | 372 | 141 | 0.8317 | 0.024 | 0.0053 | 0.8 |
| Commercial Cat B | 90 | 372 | 141 | 0.8317 | 0.024 | 0.0116 | 1 |
| Commercial Cat B | 90 | 377 | 164 | 0.8317 | 0.028 | 0.0110 | 1 |
| Commercial Cat B | 90 | 389 | 233 | 0.8317 | 0.04 | 0.0144 | 1 |
| Commercial Cat B | 90 | 399 | 291 | 0.8317 | 0.05 | 0.0113 | 1 |
| Commercial Cat B | 90 | 409 | 348 | 0.8317 | 0.06 | 0.0051 | 1 |
| Commercial Cat B | 90 | 430 | 463 | 0.8317 | 0.08 | 0.0095 | 1 |

TABLE II-continued

| Catalyst | MI g/10 min | I₁₀ g/10 min | HLMI g/10 min | Activity (g/g/hr) | Log ([H2]/[C2]) | Log MI |
|---|---|---|---|---|---|---|
| Exp Cat A | 0.72 | — | 28.73 | 25193 | −1.540 | −0.143 |
| Exp Cat A | 1.48 | 13.9 | 48.88 | 25161 | −1.473 | 0.170 |
| Exp Cat A | 2.51 | 23 | 77.51 | 28608 | −1.318 | 0.400 |
| Exp Cat A | 4.6 | 42 | 142.46 | 30980 | −1.221 | 0.663 |
| Exp Cat A | 8.38 | 69.5 | 235.73 | 25189 | −1.142 | 0.923 |
| Exp Cat A | 13.88 | 117.9 | 402.56 | 30488 | −1.017 | 1.142 |
| Exp Cat A | 32.76 | 234.4 | high | 18889 | −0.920 | 1.515 |
| Experimental Cat 1 | 10.94 | 101.9 | 209.20 | 991 | −1.017 | 1.039 |
| Experimental Cat 1 | 11.88 | 122.1 | 224.07 | 996 | −0.920 | 1.075 |
| Experimental Cat 1 | 4.91 | 52.8 | 193.95 | 1096 | −1.142 | 0.691 |
| Experimental Cat 1 | 2.99 | 33.9 | 127.00 | 1084 | −1.221 | 0.476 |
| Experimental Cat 1 | 1.64 | 19.4 | 75.00 | 1418 | −1.318 | 0.216 |
| Experimental Cat 1 | 0.43 | 6.5 | 25.79 | 1335 | −1.473 | −0.367 |
| Experimental Cat 1 | 0.18 | 4.0 | 462.00 | 1528 | −1.540 | −0.750 |
| Commercial Cat A | 5.90 | 59.7 | 225.91 | 44386 | −1.017 | 0.771 |
| Commercial Cat A | 11.80 | 114.5 | 415.72 | 53647 | −0.920 | 1.072 |
| Commercial Cat A | 3.05 | 32.2 | 125.52 | 48905 | −1.142 | 0.484 |
| Commercial Cat A | 1.44 | 14.9 | 61.01 | 71698 | −1.221 | 0.158 |
| Commercial Cat A | 1.04 | 10.4 | 40.63 | 55793 | −1.318 | 0.017 |
| Commercial Cat A | 0.43 | 4.6 | 18.67 | 51429 | −1.473 | −0.370 |
| Commercial Cat A | 0.19 | 2.7 | 11.02 | 79623 | −1.540 | −0.733 |
| Commercial Cat B | 0.40 | 5.1 | 20.07 | 42931 | −1.540 | −0.403 |
| Commercial Cat B | 0.77 | 7.7 | 29.44 | 39455 | −1.473 | −0.116 |
| Commercial Cat B | 1.78 | 17.2 | 63.00 | 39167 | −1.318 | 0.251 |
| Commercial Cat B | 2.67 | 26.6 | 99.55 | — | −1.221 | 0.427 |
| Commercial Cat B | 9.02 | 83.5 | 323.07 | 34118 | −1.142 | 0.955 |
| Commercial Cat B | 10.46 | 103.8 | 380.32 | 44421 | −1.017 | 1.020 |

TABLE III

| Catalyst | Temp (° C.) | C₂ (psig) | H₂ (delta psi) | C₆ (g) | [C₂] | [C₆] | [C₆]/[C₂] | SQRT ([C6]/[C2]) |
|---|---|---|---|---|---|---|---|---|
| Experimental Cat 1 | 90 | 430 | 463 | 25 | 1.437 | 0.101 | 0.070 | 0.265 |
| Experimental Cat 1 | 90 | 430 | 463 | 50 | 1.466 | 0.201 | 0.137 | 0.371 |
| Experimental Cat 1 | 90 | 430 | 463 | 100 | 1.523 | 0.402 | 0.264 | 0.513 |
| Experimental Cat 1 | 90 | 430 | 463 | 150 | 1.580 | 0.602 | 0.381 | 0.617 |
| Experimental Cat 1 | 90 | 430 | 463 | 200 | 1.637 | 0.802 | 0.490 | 0.700 |
| Exp Cat A | 90 | 430 | 463 | 25 | 1.437 | 0.101 | 0.070 | 0.265 |
| Exp Cat A | 90 | 430 | 463 | 50 | 1.466 | 0.201 | 0.137 | 0.371 |
| Exp Cat A | 90 | 430 | 463 | 100 | 1.523 | 0.402 | 0.264 | 0.513 |
| Exp Cat A | 90 | 430 | 463 | 150 | 1.580 | 0.602 | 0.381 | 0.617 |
| Exp Cat A | 90 | 430 | 463 | 200 | 1.637 | 0.802 | 0.490 | 0.700 |
| Commercial Cat A | 90 | 430 | 463 | 25 | 1.437 | 0.101 | 0.070 | 0.265 |
| Commercial Cat A | 90 | 430 | 463 | 50 | 1.466 | 0.201 | 0.137 | 0.371 |
| Commercial Cat A | 90 | 430 | 463 | 100 | 1.523 | 0.402 | 0.264 | 0.513 |
| Commercial Cat A | 90 | 430 | 463 | 150 | 1.580 | 0.602 | 0.381 | 0.617 |
| Commercial Cat A | 90 | 430 | 463 | 200 | 1.637 | 0.802 | 0.490 | 0.700 |
| Commercial Cat B | 90 | 430 | 463 | 25 | 1.437 | 0.101 | 0.070 | 0.265 |
| Commercial Cat B | 90 | 430 | 463 | 50 | 1.466 | 0.201 | 0.137 | 0.371 |
| Commercial Cat B | 90 | 430 | 463 | 100 | 1.523 | 0.402 | 0.264 | 0.513 |
| Commercial Cat B | 90 | 430 | 463 | 150 | 1.580 | 0.602 | 0.381 | 0.617 |
| Commercial Cat B | 90 | 430 | 463 | 200 | 1.637 | 0.802 | 0.490 | 0.700 |

| Catalyst | Cat. Wt. (g) | TEA (mL) | Activity (g/g hr) | MI | I₁₀ (g/10 min) | HLMI | Density (g/cc) | 1/Density (cc/g) |
|---|---|---|---|---|---|---|---|---|
| Experimental Cat 1 | 0.0252 | 0.8 | 20619 | 17.36 | 154.0 | 315 | 0.9602 | 1.0414 |
| Experimental Cat 1 | 0.0181 | 0.8 | 31547 | 16.71 | 192.6 | 263 | 0.9571 | 1.0448 |
| Experimental Cat 1 | 0.0279 | 0.8 | 23728 | 24.72 | 208.1 | High | 0.9526 | 1.0498 |
| Experimental Cat 1 | 0.0211 | 0.8 | 18673 | 25.81 | 229.2 | High | 0.9514 | 1.0511 |
| Experimental Cat 1 | 0.0117 | 0.8 | 15282 | 22.36 | 194.6 | High | 0.9501 | 1.0525 |
| Exp Cat A | 0.0096 | 0.8 | 23792 | 31.83 | 261.5 | High | 0.9629 | 1.0385 |
| Exp Cat A | 0.0151 | 0.8 | 17444 | 47.82 | 400.1 | High | 0.9543 | 1.0479 |
| Exp Cat A | 0.0240 | 0.8 | 17500 | 28.69 | 243.7 | High | 0.9518 | 1.0506 |
| Exp Cat A | 0.0113 | 0.8 | 15150 | 47.24 | 417.3 | High | 0.9482 | 1.0546 |
| Exp Cat A | 0.0200 | 0.8 | 17340 | 9.32 | 84.9 | 302 | 0.9424 | 1.0611 |
| Commercial Cat A | 0.0077 | 0.8 | 117662 | 0.01 | 0.3 | 1.77 | 0.9429 | 1.0606 |
| Commercial Cat A | 0.0097 | 0.8 | 68990 | 11.62 | 101.6 | 369 | 0.9486 | 1.0542 |
| Commercial Cat A | 0.0043 | 0.8 | 82125 | 16.77 | 147.9 | 405 | 0.9406 | 1.0632 |
| Commercial Cat A | 0.0106 | 0.8 | 60849 | 31.68 | 298.8 | High | 0.9267 | 1.0791 |
| Commercial Cat A | 0.0043 | 0.8 | 111209 | 1.23 | 11.9 | 43.6 | 0.9362 | 1.0681 |
| Commercial Cat B | 0.0188 | 0.8 | 20617 | 30.34 | 265.2 | 984 | 0.9572 | 1.0447 |
| Commercial Cat B | 0.0167 | 0.8 | 24132 | 22.08 | 205.5 | 736 | 0.9494 | 1.0533 |

TABLE III-continued

| Commercial Cat B | 0.0128 | 0.8 | 33242 | 30.51 | 251.1 | 931 | 0.9443 | 1.0590 |
|---|---|---|---|---|---|---|---|---|
| Commercial Cat B | 0.0095 | 0.8 | 37739 | 26.53 | 220.0 | 804 | 0.9342 | 1.0704 |
| Commercial Cat B | 0.0150 | 0.8 | 16147 | 118.31 | 1425 | 5246 | 0.9176 | 1.0898 |

The invention is described above with reference to numerous aspects and specific examples. Many variations will suggest themselves to those skilled in the art in light of the above detailed description. All such obvious variations are within the full intended scope of the appended claims. Other aspects of the invention can include, but are not limited to, the following (aspects are described as "comprising" but, alternatively, can "consist essentially of" or "consist of"):

Aspect 1. A process to produce a microcrystalline solid alkoxymagnesium halide support having the formula $Mg(OR^1)_nX_{2-n}$, the process comprising:
(i) contacting a dialkylmagnesium compound having the formula $MgR_2$ with an alcohol compound having the formula $R^1OH$ to form an alkylmagnesium alkoxide compound having the formula $Mg(OR^1)R$; and
(ii) contacting the alkylmagnesium alkoxide compound having the formula $Mg(OR^1)R$ with a halide compound having the formula $SiX_4$ to form a mixture containing the microcrystalline solid alkoxymagnesium halide support having the formula $Mg(OR^1)_nX_{2-n}$; wherein:
each R independently is a linear or branched alkyl group;
$R^1$ is a linear or branched $C_5$-$C_{18}$ alkyl group;
each X independently is a halogen;
n is a number from 0.5 to 1.5; and
the microcrystalline solid alkoxymagnesium halide support is characterized by a lattice spacing in a range from about 5 nm to about 15 nm.

Aspect 2. The process defined in aspect 1, wherein the dialkylmagnesium compound comprises any suitable dialkylmagnesium compound or any dialkylmagnesium compound disclosed herein, e.g., diethyl magnesium, dipropyl magnesium, dibutyl magnesium, dihexyl magnesium, butyl ethyl magnesium, butyl octyl magnesium, etc., or any combination thereof.

Aspect 3. The process defined in aspect 1 or 2, wherein each R independently is any suitable alkyl group or any alkyl group disclosed herein, e.g., a $C_1$ to $C_{18}$ linear or branched alkyl group, a $C_1$ to $C_{12}$ linear or branched alkyl group, a $C_1$ to $C_6$ linear or branched alkyl group, etc.

Aspect 4. The process defined in aspect 1 or 2, wherein each R independently is a methyl group, an ethyl group, a propyl group, a butyl group, a pentyl group, a hexyl group, a heptyl group, an octyl group, a nonyl group, a decyl group, a undecyl group, a dodecyl group, a tridecyl group, a tetradecyl group, a pentadecyl group, a hexadecyl group, a heptadecyl group, or an octadecyl group.

Aspect 5. The process defined in aspect 1 or 2, wherein each R independently is a methyl group, an ethyl group, a n-propyl group, an iso-propyl group, a n-butyl group, an iso-butyl group, a sec-butyl group, a tert-butyl group, a n-pentyl group, an iso-pentyl group, a sec-pentyl group, or a neopentyl group.

Aspect 6. The process defined in any one of aspects 1-5, wherein the alcohol compound comprises a pentanol, a hexanol, a heptanol, an octanol, a nonanol, a decanol, an undecanol, a dodecanol, a tridecanol, a tetradecanol, a pentadecanol, a hexadecanol, a heptadecanol, an octadecanol, or any combination thereof.

Aspect 7. The process defined in any one of aspects 1-5, wherein the alcohol compound comprises 1-pentanol, 1-hexanol, 2-hexanol, 3-hexanol, 1-heptanol, 2-heptanol, 3-heptanol, 4-heptanol, 1-octanol, 2-octanol, 3-octanol, 4-octanol, 2-ethyl-1-hexanol, 2-methyl-3-heptanol, 1-decanol, 2-decanol, 3-decanol, 4-decanol, 5-decanol, 1-undecanol, 2-undecanol, 7-methyl-2-decanol, 1-dodecanol, 2-dodecanol, 2-ethyl-1-decanol, 1-tetradecanol, 1-hexadecanol, 1-octadecanol, or any combination thereof.

Aspect 8. The process defined in any one of aspects 1-7, wherein a molar ratio of the alcohol compound to the dialkylmagnesium compound in step (i) is any suitable molar ratio or a molar ratio in any range disclosed herein, e.g., from about 0.4:1 to about 1.2:1, from about 0.4:1 to about 1:1, from about 0.4:1 to about 0.8:1, from about 0.5:1 to about 0.9:1, from about 0.6:1 to about 0.7:1, etc.

Aspect 9. The process defined in any one of aspects 1-8, wherein step (i) comprises contacting the dialkylmagnesium compound and the alcohol compound at any suitable temperature or in any temperature range disclosed herein, e.g., from about 15° C. to about 80° C., from about 40° C. to about 70° C., etc., and/or in any suitable non-polar solvent or any non-polar solvent disclosed herein, e.g., an aromatic hydrocarbon (e.g., toluene and xylene), an alkane (e.g., hexane and heptane), etc., or any combination thereof.

Aspect 10. The process defined in any one of aspects 1-9, wherein a molar ratio of the halide compound to the alkylmagnesium alkoxide compound in step (ii) is any suitable molar ratio or a molar ratio in any range disclosed herein, e.g., from about 0.4:1 to about 1.2:1, from about 0.6:1 to about 1.2:1, from about 0.6:1 to about 1:1, from about 0.7:1 to about 0.9:1, or from about 0.8:1 to about 1:1, etc.

Aspect 11. The process defined in any one of aspects 1-10, wherein step (ii) comprises contacting the alkylmagnesium alkoxide compound and the halide compound at any suitable temperature or in any temperature range disclosed herein, e.g., from about 5° C. to about 80° C., from about 10° C. to about 70° C., etc., and/or in any suitable non-polar solvent or any non-polar solvent disclosed herein, e.g., an aromatic hydrocarbon (e.g., toluene and xylene), an alkane (e.g., hexane and heptane), etc., or any combination thereof.

Aspect 12. The process defined in any one of aspects 1-11, further comprising isolating the microcrystalline solid alkoxymagnesium halide support from the mixture after step (ii) using any suitable technique or any technique disclosed herein, e.g., draining, sieving, filtering, pressing, centrifuging, etc., or any combination thereof.

Aspect 13. The process defined in any one of aspects 1-12, further comprising washing the microcrystalline solid alkoxymagnesium halide support after step (ii).

Aspect 14. A microcrystalline solid alkoxymagnesium halide support prepared by the process defined in any one of the preceding aspects.

Aspect 15. A microcrystalline solid alkoxymagnesium halide support having the formula $Mg(OR^1)_nX_{2-n}$; wherein:
$R^1$ is a linear or branched $C_5$-$C_{18}$ alkyl group;
each X independently is a halogen;
n is a number from 0.5 to 1.5; and
the microcrystalline solid alkoxymagnesium halide support is characterized by a lattice spacing in a range from about 5 nm to about 15 nm.

Aspect 16. The process or support defined in any one of aspects 1-15, wherein $R^1$ is any suitable alkyl group or any alkyl group disclosed herein, e.g., a linear or branched $C_5$-$C_{14}$ alkyl group, a linear or branched $C_6$-$C_{18}$ alkyl group, a linear or branched $C_8$-$C_{12}$ alkyl group, etc.

Aspect 17. The process or support defined in any one of aspects 1-15, wherein $R^1$ is a pentyl group, a hexyl group, a heptyl group, an octyl group, a nonyl group, a decyl group, a undecyl group, a dodecyl group, a tridecyl group, or a tetradecyl group.

Aspect 18. The process or support defined in any one of aspects 1-15, wherein $R^1$ is a hexyl group, a heptyl group, an octyl group, a nonyl group, a decyl group, a undecyl group, a dodecyl group, a tridecyl group, a tetradecyl group, a pentadecyl group, a hexadecyl group, a heptadecyl group, or an octadecyl group.

Aspect 19. The process or support defined in any one of aspects 1-18, wherein each X independently is bromine or chlorine, or each X is chlorine.

Aspect 20. The process or support defined in any one of aspects 1-19, wherein n is from 0.6 to 1.4, or from 0.8 to 1.2.

Aspect 21. The process or support defined in any one of aspects 1-20, wherein the lattice spacing is in a range from about 5 nm to about 12 nm, from about 5 nm to about 10 nm, from about 6 nm to about 15 nm, from about 6 nm to about 12 nm, etc.

Aspect 22. A process to produce a titanium alkoxymagnesium halide supported catalyst, the process comprising:
contacting the microcrystalline solid alkoxymagnesium halide support defined in any one of aspects 14-21 with a titanium compound to form the titanium alkoxymagnesium halide supported catalyst;
wherein the titanium alkoxymagnesium halide supported catalyst is characterized by a lattice spacing in any range from about 5 nm to about 15 nm disclosed herein.

Aspect 23. The process defined in aspect 22, wherein a slurry of the microcrystalline solid alkoxymagnesium halide support in a diluent is contacted with the titanium compound.

Aspect 24. The process defined in aspect 22 or 23, wherein the titanium alkoxymagnesium halide supported catalyst is contacted with a second titanium compound, which can be the same as or different from the titanium compound.

Aspect 25. The process defined in any one of aspects 22-24, further comprising isolating the titanium alkoxymagnesium halide supported catalyst using any suitable technique or any technique disclosed herein, e.g., draining, sieving, filtering, pressing, centrifuging, etc., or any combination thereof.

Aspect 26. The process defined in any one of aspects 22-25, further comprising washing the titanium alkoxymagnesium halide supported catalyst.

Aspect 27. The process defined in any one of aspects 22-26, further comprising drying the titanium alkoxymagnesium halide supported catalyst.

Aspect 28. The process defined in any one of aspects 22-27, wherein the titanium compound (or the second titanium compound) comprises any suitable titanium compound or any titanium compound disclosed herein, e.g., a titanium halide (e.g., $TiCl_3$, $TiCl_4$, $TiBr_4$, or $TiI_4$), a titanium alkoxide ($Ti(OEt)_4$ or $Ti(OPr)_4$), an alkoxytitanium halide (e.g., $Ti(OBu)Cl_3$ or $Ti(OBu)_2Cl_2$), etc., or any combination thereof.

Aspect 29. A titanium alkoxymagnesium halide supported catalyst produced by the process defined in any one of aspects 22-28.

Aspect 30. A titanium alkoxymagnesium halide supported catalyst comprising:
titanium; and
a microcrystalline solid alkoxymagnesium halide support having the formula $Mg(OR^1)_nX_{2-n}$; wherein:
$R^1$ is any linear or branched $C_5$-$C_{18}$ alkyl group disclosed herein;
each X independently is any halogen disclosed herein;
n is any number from 0.5 to 1.5 disclosed herein; and
the catalyst is characterized by any lattice spacing in a range from about 5 nm to about 15 nm disclosed herein.

Aspect 31. The catalyst defined in aspect 29 or 30, wherein a weight percentage of titanium, based on the weight of the titanium alkoxymagnesium halide supported catalyst, is any suitable amount or in any weight percentage range disclosed herein, e.g., from about 0.1 to about 10 wt. %, from about 0.2 to about 5 wt. %, from about 0.3 to about 2 wt. %, etc.

Aspect 32. A catalyst composition comprising the supported catalyst defined in any one of aspects 29-31 and any suitable co-catalyst or any co-catalyst disclosed herein.

Aspect 33. The composition defined in aspect 32, wherein the catalyst composition comprises an aluminoxane co-catalyst, an organoaluminum co-catalyst, an organoboron co-catalyst, or any combination thereof.

Aspect 34. The composition defined in aspect 32, wherein the catalyst composition comprises an organoaluminum co-catalyst comprising trimethylaluminum, triethylaluminum, tri-n-propylaluminum, tri-n-butylaluminum, triisobutylaluminum, tri-n-hexylaluminum, tri-n-octylaluminum, diisobutylaluminum hydride, diethylaluminum ethoxide, diethylaluminum chloride, or any combination thereof.

Aspect 35. The composition defined in any one of aspects 32-34, wherein the weight ratio of the co-catalyst to the supported catalyst is any suitable weight ratio or in any range disclosed herein, e.g., from about 10:1 to about 1:1000, from about 3:1 to about 1:100, from about 1:1 to about 1:50, etc.

Aspect 36. The composition defined in any one of aspects 32-35, wherein the catalyst composition has a catalyst activity in any range of catalyst activities disclosed herein, e.g., greater than about 1,000 g/g/hr, greater than about 5,000 g/g/hr, greater than about 10,000 g/g/hr, greater than about 20,000 g/g/hr, etc.

Aspect 37. The composition defined in any one of aspects 32-36, wherein the catalyst composition is characterized by a relatively high slope of a plot of the logarithm of melt index versus the logarithm of $[H_2]/[C_2]$.

Aspect 38. An olefin polymerization process, the process comprising contacting the catalyst composition defined in any one of aspects 32-37 with an olefin monomer and an optional olefin comonomer in a polymerization reactor system under polymerization conditions to produce an olefin polymer.

Aspect 39. The process defined in aspect 38, wherein the olefin monomer comprises any olefin monomer disclosed herein, e.g., any $C_2$-$C_{20}$ olefin.

Aspect 40. The process defined in aspect 38 or 39, wherein the olefin monomer and the optional olefin comonomer independently comprise a $C_2$-$C_{20}$ alpha-olefin.

Aspect 41. The process defined in any one of aspects 38-40, wherein the olefin monomer comprises ethylene.

Aspect 42. The process defined in any one of aspects 38-41, wherein the catalyst composition is contacted with ethylene and an olefin comonomer comprising a $C_3$-$C_{10}$ alpha-olefin.

Aspect 43. The process defined in any one of aspects 38-42, wherein the catalyst composition is contacted with ethylene and an olefin comonomer comprising 1-butene, 1-hexene, 1-octene, or a mixture thereof.

Aspect 44. The process defined in any one of aspects 38-40, wherein the olefin monomer comprises propylene.

Aspect 45. The process defined in any one of aspects 38-44, wherein the polymerization reactor system comprises a batch reactor, a slurry reactor, a gas-phase reactor, a solution reactor, a high pressure reactor, a tubular reactor, an autoclave reactor, or a combination thereof.

Aspect 46. The process defined in any one of aspects 38-45, wherein the polymerization reactor system comprises a slurry reactor, a gas-phase reactor, a solution reactor, or a combination thereof.

Aspect 47. The process defined in any one of aspects 38-46, wherein the polymerization reactor system comprises a loop slurry reactor.

Aspect 48. The process defined in any one of aspects 38-47, wherein the polymerization reactor system comprises a single reactor.

Aspect 49. The process defined in any one of aspects 38-47, wherein the polymerization reactor system comprises 2 reactors.

Aspect 50. The process defined in any one of aspects 38-47, wherein the polymerization reactor system comprises more than 2 reactors.

Aspect 51. The process defined in any one of aspects 38-50, wherein the olefin polymer comprises any olefin polymer disclosed herein.

Aspect 52. The process defined in any one of aspects 38-43 and 45-51, wherein the olefin polymer comprises an ethylene homopolymer, an ethylene/1-butene copolymer, an ethylene/1-hexene copolymer, and/or an ethylene/1-octene copolymer.

Aspect 53. The process defined in any one of aspects 38-40 and 44-51, wherein the olefin polymer comprise(s) a polypropylene homopolymer and/or a propylene-based copolymer.

Aspect 54. The process defined in any one of aspects 38-53, wherein the polymerization conditions comprise a polymerization reaction temperature in a range from about 60° C. to about 120° C. and a reaction pressure in a range from about 200 to about 1000 psig (about 1.4 to about 6.9 MPa).

Aspect 55. The process defined in any one of aspects 38-54, wherein the polymerization conditions are substantially constant, e.g., for a particular polymer grade.

Aspect 56. The process defined in any one of aspects 38-55, wherein no hydrogen is added to the polymerization reactor system.

Aspect 57. The process defined in any one of aspects 38-55, wherein hydrogen is added to the polymerization reactor system.

Aspect 58. The process defined in any one of aspects 38-57, wherein the olefin polymer is characterized by any MI disclosed herein, and/or any HLMI disclosed herein, and/or any density disclosed herein, and/or any Mn disclosed herein, and/or any Mw disclosed herein, and/or any Mz disclosed herein, and/or any Mw/Mn disclosed herein, and/or any Mz/Mw disclosed herein.

Aspect 59. An olefin polymer produced by the polymerization process defined in any one of aspects 38-58.

Aspect 60. An article comprising the olefin polymer defined in aspect 59.

We claim:
1. A process to produce a titanium alkoxymagnesium halide supported catalyst, the process comprising:
   (i) contacting a dialkylmagnesium compound having the formula $MgR_2$ with an alcohol compound having the formula $R^1OH$ to form an alkylmagnesium alkoxide compound having the formula $Mg(OR^1)R$;
   (ii) contacting the alkylmagnesium alkoxide compound having the formula $Mg(OR^1)R$ with a halide compound having the formula $SiX_4$ to form a mixture containing a microcrystalline solid alkoxymagnesium halide support having the formula $Mg(OR^1)_nX_{2-n}$; wherein:
   each R independently is a linear or branched alkyl group;
   $R^1$ is a linear or branched $C_5$-$C_{18}$ alkyl group;
   each X independently is a halogen;
   n is a number from 0.5 to 1.5; and
   (iii) contacting the microcrystalline solid alkoxymagnesium halide support with a titanium compound to form the titanium alkoxymagnesium halide supported catalyst;
   wherein the titanium alkoxymagnesium halide supported catalyst is characterized by a lattice spacing in a range from about 5 nm to about 15 nm.

2. The process of claim 1, wherein:
   the dialkylmagnesium compound comprises diethyl magnesium, dipropyl magnesium, dibutyl magnesium, dihexyl magnesium, butyl ethyl magnesium, butyl octyl magnesium, or any combination thereof;
   the alcohol compound comprises a pentanol, a hexanol, a heptanol, an octanol, a nonanol, a decanol, an undecanol, a dodecanol, a tridecanol, a tetradecanol, a pentadecanol, a hexadecanol, a heptadecanol, an octadecanol, or any combination thereof; and
   each X independently is bromine or chlorine.

3. The process of claim 1, wherein:
   each R independently is a $C_1$ to $C_{18}$ linear or branched alkyl group;
   $R^1$ is a linear or branched $C_5$-$C_{14}$ alkyl group; and
   each X is chlorine.

4. The process of claim 1, wherein:
   step (i) is conducted in a non-polar solvent;
   step (ii) is conducted in a non-polar solvent; or
   both.

5. The process of claim 1, wherein a molar ratio of the alcohol compound to the dialkylmagnesium compound in step (i) is from about 0.4:1 to about 1.2:1.

6. The process of claim 1, wherein a molar ratio of the halide compound to the alkylmagnesium alkoxide compound in step (ii) is from about 0.6:1 to about 1.2:1.

7. The process of claim 1, wherein n is from 0.6 to 1.4.

8. The process of claim 1, wherein the lattice spacing is in a range from about 5 nm to about 12 nm.

9. The process of claim 1, wherein the supported catalyst comprises from about 0.2 to about 5 wt. % titanium.

10. The process of claim 1, wherein:
    a slurry of the microcrystalline solid alkoxymagnesium halide support in a diluent is contacted with the titanium compound in step (iii);
    the titanium compound comprises a titanium halide, a titanium alkoxide, an alkoxytitanium halide, or any combination thereof; and
    the process further comprises a step of contacting the supported catalyst with a second titanium compound.

11. A catalyst composition comprising a co-catalyst and a titanium alkoxymagnesium halide supported catalyst comprising:

titanium; and a microcrystalline solid alkoxymagnesium halide support having the formula $Mg(OR^1)_nX_{2-n}$; wherein:

$R^1$ is a linear or branched $C_5$-$C_{18}$ alkyl group;

each X independently is a halogen;

n is a number from 0.5 to 1.5; and the catalyst is characterized by a lattice spacing in a range from about 5 nm to about 15 nm.

12. The composition of claim 11, wherein the catalyst composition comprises an aluminoxane co-catalyst, an organoaluminum co-catalyst, an organoboron co-catalyst, or any combination thereof.

13. The composition of claim 11, wherein:

the supported catalyst comprises from about 0.1 to about 10 wt. % titanium; and a weight ratio of the co-catalyst to the supported catalyst is in a range from about 3:1 to about 1:100.

14. The composition of claim 11, wherein:

$R^1$ is a hexyl group, a heptyl group, an octyl group, a nonyl group, a decyl group, a undecyl group, a dodecyl group, a tridecyl group, a tetradecyl group, a pentadecyl group, a hexadecyl group, a heptadecyl group, or an octadecyl group;

each X is Cl;

n is from 0.8 to 1.2; and the lattice spacing is in a range from about 6 nm to about 15 nm.

15. The composition of claim 11, wherein the catalyst composition has a catalyst activity greater than about 5,000 g/g/hr, under slurry polymerization conditions, with a triethylaluminum co-catalyst, using isobutane as the diluent, at a polymerization temperature of 90° C. and a reactor pressure of 430 psig.

16. The composition of claim 11, wherein:

$R^1$ is a linear or branched $C_5$-$C_{12}$ alkyl group;

each X is Cl; and the lattice spacing is in a range from about 5 nm to about 10 nm.

17. An olefin polymerization process, the process comprising contacting the catalyst composition of claim 11 with an olefin monomer and an optional olefin comonomer in a polymerization reactor system under polymerization conditions to produce an olefin polymer.

18. The process of claim 17, wherein the catalyst composition is contacted with ethylene and an olefin comonomer comprising 1-butene, 1-hexene, 1-octene, or a mixture thereof.

19. The process of claim 17, wherein:

the polymerization reactor system comprises a slurry reactor, a gas-phase reactor, a solution reactor, or a combination thereof; and the olefin polymer comprises an ethylene homopolymer and/or an ethylene/alpha-olefin copolymer.

20. A microcrystalline solid alkoxymagnesium halide support having the formula $Mg(OR^1)_nX_{2-n}$; wherein:

le is a linear or branched $C_5$-$C_{18}$ alkyl group;

each X independently is a halogen;

n is a number from 0.5 to 1.5; and the microcrystalline solid alkoxymagnesium halide support is characterized by a lattice spacing in a range from about 5 nm to about 15 nm.

21. The composition of claim 11, wherein:

$R^1$ is a linear or branched $C_5$-$C_{14}$ alkyl group; and each X is chlorine.

22. The composition of claim 21, wherein:

n is from 0.6 to 1.4; and the lattice spacing is in a range from about 5 nm to about 12 nm.

23. The composition of claim 22, wherein the supported catalyst comprises from about 0.2 to about 5 wt. % titanium.

24. The composition of claim 16, wherein n is from 0.8 to 1.2.

25. The support of claim 20, wherein:

$R^1$ is a linear or branched $C_5$-$C_{14}$ alkyl group; and each X is chlorine.

26. The support of claim 20, wherein:

n is from 0.6 to 1.4; and the lattice spacing is in a range from about 5 nm to about 12 nm.

27. The support of claim 20, wherein:

$R^1$ is a hexyl group, a heptyl group, an octyl group, a nonyl group, a decyl group, a undecyl group, a dodecyl group, a tridecyl group, a tetradecyl group, a pentadecyl group, a hexadecyl group, a heptadecyl group, or an octadecyl group;

each X is Cl;

n is from 0.8 to 1.2; and the lattice spacing is in a range from about 6 nm to about 15 nm.

28. The support of claim 20, wherein:

$R^1$ is a linear or branched $C_5$-$C_{12}$ alkyl group;

each X is Cl;

n is from 0.6 to 1.4; and the lattice spacing is in a range from about 5 nm to about 10 nm.

29. The support of claim 28, wherein n is from 0.8 to 1.2.

* * * * *